United States Patent
Milleret et al.

(10) Patent No.: US 12,486,364 B2
(45) Date of Patent: Dec. 2, 2025

(54) ELECTROCHEMICALLY ENGINEERED SURFACE OF HYDROGELS, PARTICULARLY PEG HYDROGELS, FOR ENHANCED CELLULAR PENETRATION

(71) Applicants: UNIVERSITAT ZURICH, Zurich (CH); ETH ZURICH, Zurich (CH)

(72) Inventors: Vincent Milleret, Zurich (CH); Benjamin R. Simona, Zurich (CH); Janos Voros, Zurich (CH); Martin Ehrbar, Wil/SG (CH)

(73) Assignees: UNIVERSITAT ZURICH, Zurich (CH); ETH ZURICH, Zuri (CH)

( * ) Notice: Subject to any disclaimer, the term of this patent is extended or adjusted under 35 U.S.C. 154(b) by 205 days.

(21) Appl. No.: 16/931,452

(22) Filed: Jul. 17, 2020

(65) Prior Publication Data
US 2021/0032412 A1    Feb. 4, 2021

Related U.S. Application Data

(63) Continuation of application No. 15/025,558, filed as application No. PCT/EP2014/070827 on Sep. 29, 2014, now abandoned.

(30) Foreign Application Priority Data

Sep. 29, 2013 (EP) .................................. 13186561
Oct. 1, 2013 (EP) .................................. 13186965

(51) Int. Cl.
*C08J 3/075*  (2006.01)
*C08G 65/08*  (2006.01)
(Continued)

(52) U.S. Cl.
CPC .............. *C08J 3/075* (2013.01); *C08G 65/08* (2013.01); *C08G 65/2696* (2013.01);
(Continued)

(58) Field of Classification Search
None
See application file for complete search history.

(56) References Cited

U.S. PATENT DOCUMENTS

| | | |
|---|---|---|
| 2002/0008038 A1 | 1/2002 | Heller et al. |
| 2011/0171239 A1 | 7/2011 | Kaplan et al. |
| 2013/0243693 A1 | 9/2013 | Omenetto et al. |

FOREIGN PATENT DOCUMENTS

| | | |
|---|---|---|
| CN | 101765436 | 6/2010 |
| JP | 4380538 | 1/2006 |
| WO | 2011130335 | 10/2011 |

OTHER PUBLICATIONS

Turturro et al., PLoS One 8(3): e58897 (2013).*
(Continued)

*Primary Examiner* — Erin M. Bowers
(74) *Attorney, Agent, or Firm* — JMB Davis Ben-David

(57) ABSTRACT

The invention relates to a polymer structure (1) formed by at least a polymer, wherein said structure (1) comprises a volume (2) and a surface (3), wherein said polymer comprises a plurality of polymer chains connected by linkings, characterized by a linking density, wherein said linking density increases, particularly monotonously, from the surface (3) into the volume (2) of the polymer structure (1).

18 Claims, 22 Drawing Sheets

(51) Int. Cl.

| | |
|---|---|
| *C08G 65/26* | (2006.01) |
| *C08G 65/32* | (2006.01) |
| *C12N 11/04* | (2006.01) |
| *C12P 7/18* | (2006.01) |
| *C25B 3/00* | (2021.01) |
| *C25B 3/29* | (2021.01) |
| *C25B 9/30* | (2021.01) |
| *C25B 11/02* | (2021.01) |
| *C25B 11/04* | (2021.01) |

(52) U.S. Cl.
CPC .............. *C08G 65/32* (2013.01); *C12N 11/04* (2013.01); *C12P 7/18* (2013.01); *C25B 3/00* (2013.01); *C25B 3/29* (2021.01); *C25B 3/295* (2021.01); *C25B 9/30* (2021.01); *C25B 11/02* (2013.01); *C25B 11/04* (2013.01); *C08G 2210/00* (2013.01)

(56) References Cited

OTHER PUBLICATIONS

Sanborn T J et al: "In situ crosslinking of a biomimetic peptide-PEG hydrogel via thermally triggered activation of factor XIII" Biomaterials, Elsevier Science Publishers BV., Barking, GB, vol. 23, No. 13, Jul. 1, 2002 (Jul. 1, 2002), pp. 2703-2710.
Jason A. Burdick et al: "Fabrication of Gradient Hydrogels Using a Microfluidics/Photopolymerization Process", Langmuir, vol. 20, No. 13, Jun. 1, 2004 (Jun. 1, 2004), pp. 5153-5156.
Tuturro et al., PLoS One 8(3): e58897 (2013).

\* cited by examiner

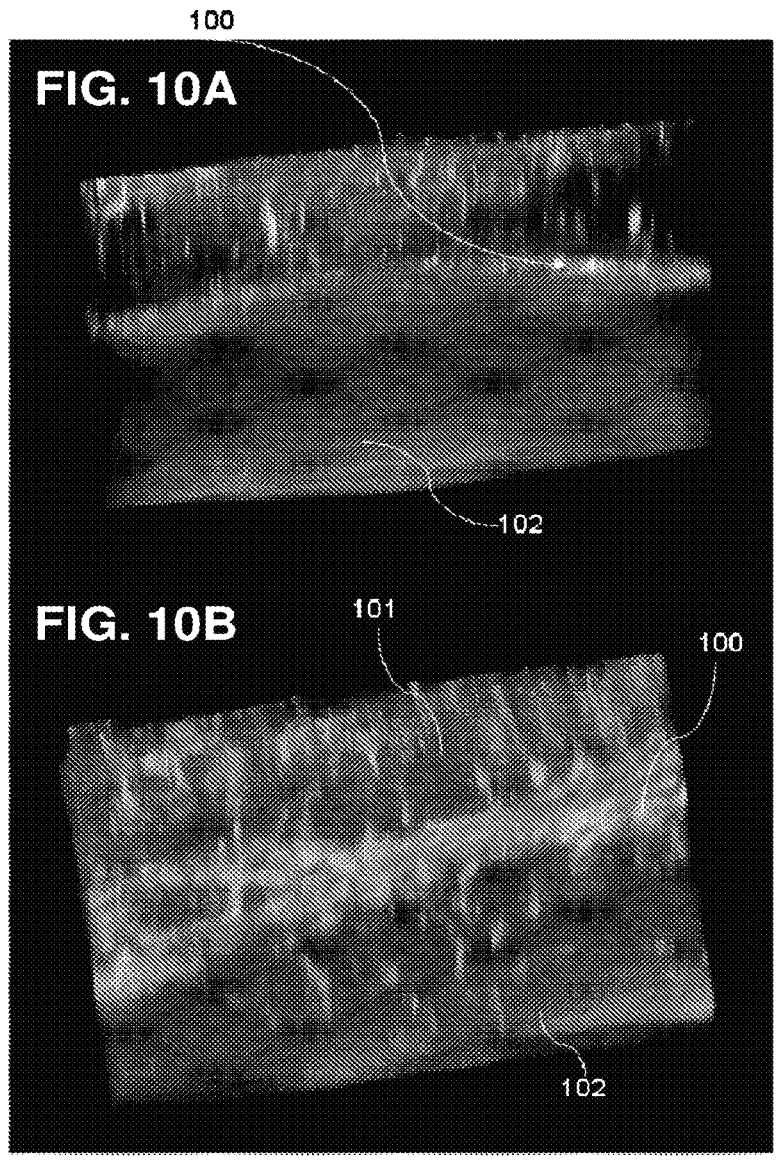

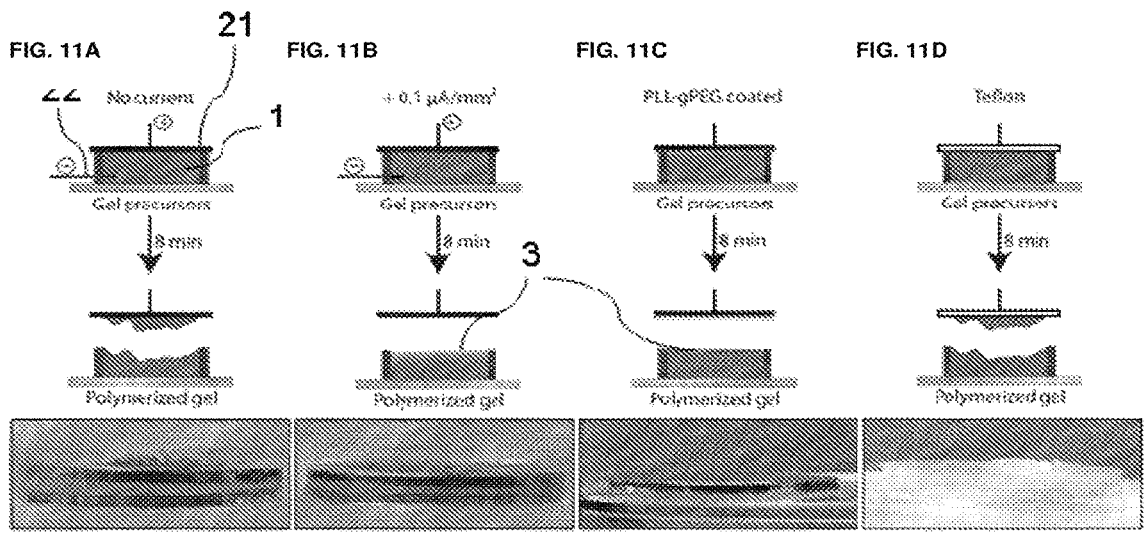
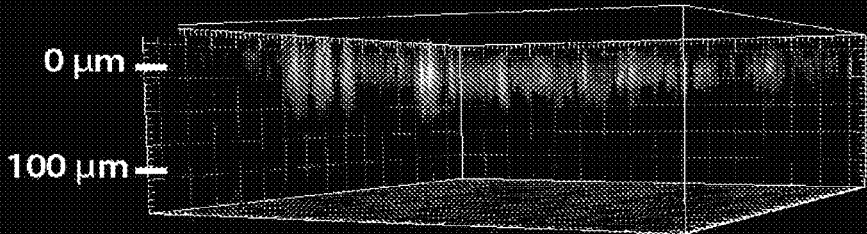
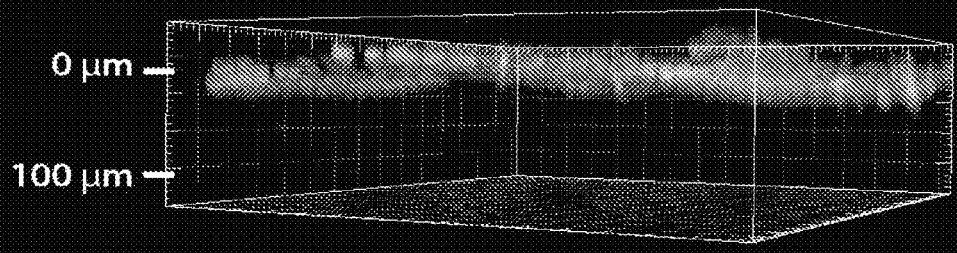

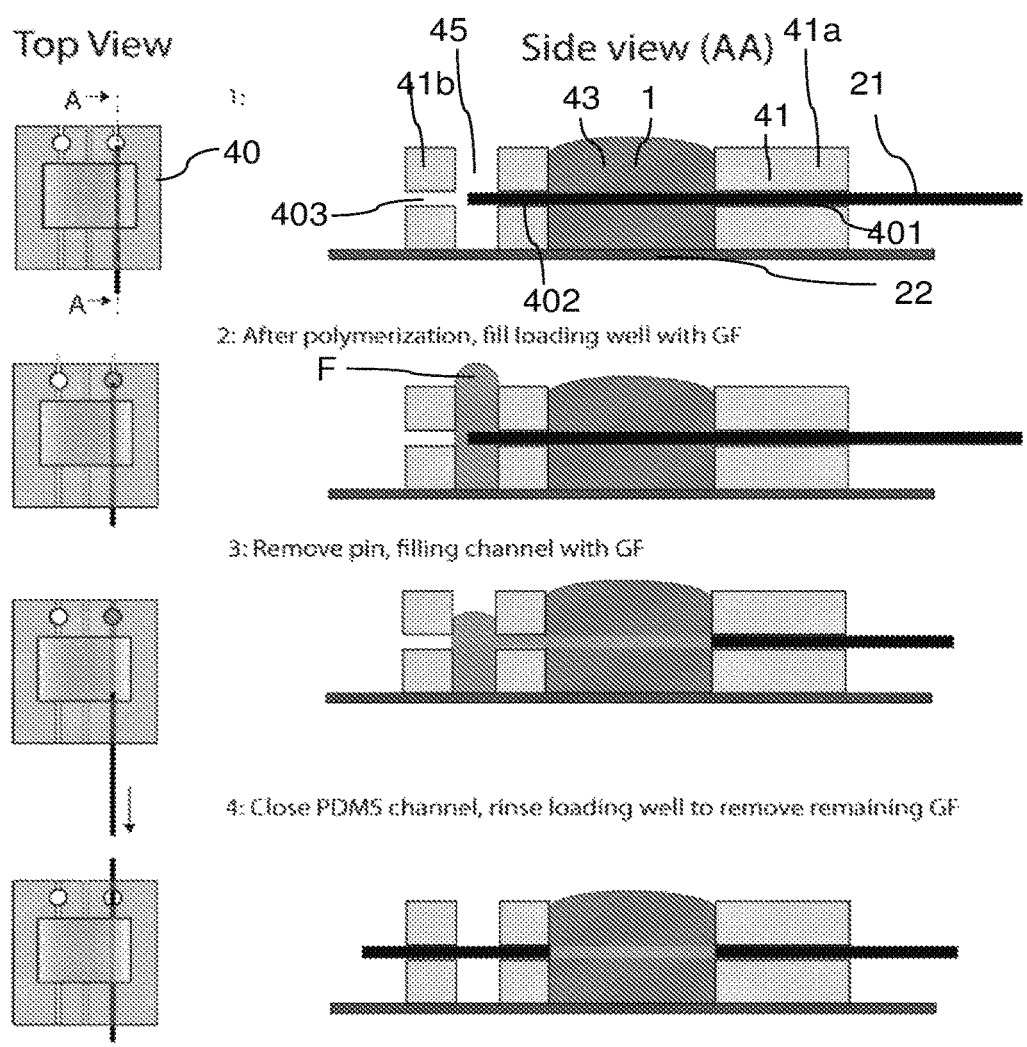

ELECTROCHEMICALLY ENGINEERED SURFACE OF HYDROGELS, PARTICULARLY PEG HYDROGELS, FOR ENHANCED CELLULAR PENETRATION

CROSS-REFERENCE TO RELATED APPLICATIONS

This is a Continuation of U.S. patent application Ser. No. 15/025,558, filed Mar. 29, 2016, which is the US National Stage of International Patent Application No. PCT/EP2014/070827, filed Sep. 29, 2014, which in turn claims priority to European Patent Application No. 13186561.0, filed Sep. 29, 2013 and European Patent Application No. 13186965.3, filed Oct. 1, 2013. The foregoing patent applications are incorporated by reference herein in their entirety.

FIELD

The invention relates to a polymer structure, a method for generating such a structure, a device, particularly for receiving such a structure, and other aspects.

BACKGROUND

Natural and synthetic hydrogels have been tremendously developed over the past decades for emulating the natural extracellular matrix (ECM) [1]. The ability to independently control the physical and chemical properties of hydrogels, makes these cell culture platforms capable of supporting the growth and differentiation of a wide range of cell types and tissues [2]. By spatially controlling the incorporation of bio-active molecules, it is possible to address the complex and heterogeneous architecture of human tissues and thus create better tissue mimics [3], [4], [4c]. Because of long reagent incubation times and extensive washing steps, the production of such patterned gels can last up to several days [3-4]. During this time, undesired interactions can take place between the soluble bio-active molecules (used to create the pattern) and the cells cultured in the hydrogel, possibly affecting them in an uncontrolled manner.

A strategy to overcome uncontrolled and unwanted cell alterations during these procedures is to seed cells after scaffold fabrication and patterning. However, cells seeded on the surface of a hydrogel, do not—or very poorly—invade the matrix [3, 5]. This phenomenon occurs also for hydrogels optimized to be permissive to embedded cells, indicating that the surface boundary represents a barrier to cell invasion of the bulk. Current strategies to enhance cell penetration mainly consist in altering the bulk properties of hydrogels by incorporating macropores via various techniques [5-6].

SUMMARY

Based on the above, the problem underlying the present invention therefore is to provide an improved polymer structure, particularly a hydrogel, that particularly enhances cell penetration without affecting the bulk properties.

This problem is solved by a polymer structure having the features of claim 1. Embodiments of the invention are stated in the sub claims and/or are described below.

According to claim 1, a polymer structure is disclosed that comprises at least a polymer, wherein said structure comprises a volume and a surface delimiting said volume, e.g. at least on one side of the volume, and wherein said polymer comprises a plurality of polymer chains connected by linkings characterized by a linking density, wherein said linking density (i.e. a density of said linkings being the number of linkings per volume) increases, particularly monotonously, more particularly strictly monotonously, and particularly continuously from the surface into/towards the volume (or bulk) of the polymer structure, so that a linking density gradient is formed/present (the direction of the gradient can be normal to said surface). Thus, the linking density is particularly not formed as a step, but increases gradually from a minimal value to a maximal value over a distance from the surface, which distance is at least 1 µm long, particularly at least 100 µm long, particularly at least 150 µm long, particularly at least 200 µm long, particularly at least 250 µm long. According to an embodiment, the functional form/course of the increasing linking density can be one of: exponential, sigmoidal or linear. Other forms are also possible. Due to the fact that the linking density is zero at the surface and increases towards the bulk (volume), the polymer structure comprises a soft surface and a stiffness that increases towards the bulk.

Particularly, a linking or linking reaction particularly refers to the chemical linking, particularly via the formation of a covalent bond between two chemical compounds, particularly a first and a second compound (e.g. polymer chain) comprising a first moiety (belonging to the first compound) and a second moiety (belonging to the second compound) between which the linking and particularly the covalent bond is established.

Particularly said surface is an outer surface (e.g. outwardly facing surface) that is a free surface (i.e. not in contact with a wall of a container in which the polymer structure can be arranged, see below)

Advantageously, such a (e.g. electrochemically) engineered gradient at a polymer (particularly hydrogel) surface allows the cell to spontaneously penetrate into the polymer/hydrogel, whereas cell seeded onto a conventionally polymerized gel form a two-dimensional cell sheet. Especially in the field of additive manufacturing, it is crucial to control the gel boundaries, in order to avoid the formation of physical barriers between assembled elements.

According to an embodiment of the polymer structure according to the invention, the linking density is 0% at the surface (i.e. no linkings at the surface) and reaches a maximal linking density (corresponding to the linking density of the bulk and hence referred to as bulk density) in the volume (which is also denoted as bulk), wherein particularly the linking density reaches said maximum at a distance from the surface ranging between 1 µm and 1000 µm. According to an embodiment said distance preferably lies between 50 µm and 150 µm.

Further, according to an embodiment of the polymer structure according to the invention, the polymer is a naturally occurring polymer, particularly one of the following polymers: fibrin, alginate, chitosan; or a synthetic polymer (i.e. a non-naturally occurring polymer, also including modified naturally occurring polymers), particularly one of the following polymers: polyethylene glycol (PEG), polyactic acid, SU-8. Further, the polymer may be any polymer consisting of—or including—a combination of monomers, e.g. of dopamine, amine-containing groups such as lysine, cathecols, phosphate containing groups, thiol containing groups, alcohol containing groups, active esters and any polymer or dendrimer containing any of said groups (e.g. Hybrane, Boltorn).

Further, according to an embodiment of the polymer structure according to the invention, the polymer structure is a composite polymer structure (blend) comprising a plurality of different polymers, wherein each polymer comprises a linking density gradient, wherein the linking density gradients span over different directions and/or different distances/lengths.

Further, according to an embodiment of the polymer structure according to the invention, the volume comprises one of the following: a spherical shape, a cylindrical shape, a cubic shape, a parallelepiped shape.

Further, according to an embodiment of the polymer structure according to the invention, said polymer chains comprise or are formed as polyethylenglycol (PEG), particularly PEG with a molar weight in the range from 4000 Da to 100000 Da, particularly 40000 Da, and wherein particularly said PEG is an unbranched or a branched PEG, wherein particularly the branched PEG comprises particularly 2, 3, 4, or 8 arms.

Further, according to an embodiment of the polymer structure according to the invention, said structure comprises cells (e.g. a basic structural, functional and/or biological unit of an organism), particularly embedded in said polymer structure. Particularly these cells are embedded into the polymer structure during the formation of said polymer structure.

Further, according to an embodiment of the polymer structure according to the invention, said polymer structure is a hydrogel.

According to a further aspect of the present invention, an implant is disclosed according to claim 9, the implant comprising a polymer structure according to the invention. Particularly, the implant is designed for use in an animal, wherein the implant is designed to enhance the cell penetration from the body of the animal into the polymer structure of the implant.

According to a further aspect of the present invention, a membrane is disclosed according to claim 10, the membrane being permeable for cells particularly implemented in a cell impermeable material, wherein the membrane comprises a polymer structure according to the invention. Cells deposited on the surface of the impermeable material and of the permeable material will migrate through the material through the permeable region only. The presence of the gradient on one side of the membrane enables directional penetration of the cells through a material (see also FIGS. 19 to 26).

Particularly, the membrane may separate two compartments, and may comprise at least one permeable region having a surface and a bulk/volume (e.g. as described above). The surface may comprises a linking density gradient (e.g. as described above) so that cells can migrate through said surface from one compartment to the other compartment. The membrane may comprise several of these permeable regions. The membrane can also comprise at least two permeable regions each having a surface with a gradient according to the invention, wherein one surface faces one of the compartments and the other surface faces the other compartment.

According to a further aspect of the present invention, a method is disclosed according to claim 11, namely a method for embedding cells into a matrix (e.g. polymer structure), the method comprising the steps of
providing a polymer structure according to the invention, seeding cells on the surface on said surface of said polymer structure, so that particularly the cells penetrate into the volume of the polymer structure, particularly due to said linking density gradient.

According to a further aspect of the present invention, a method for generating a polymer structure is disclosed according to claim 12.

According thereto, the method for generating a polymer structure comprising a volume, a surface and a linking density gradient, particularly according to the invention, comprises the steps of:
providing a polymer comprising a plurality of polymer chains, wherein each polymer chain comprises a moiety (particularly, the moieties of two polymer chains may be equal or different from one another),
generating the polymer structure by connecting polymer chains by a linking reaction between the moieties of said polymer chains (particularly, the linking reaction may occur directly between the moieties or may take place indirectly via a cross-linker) such that a linking density gradient is formed, wherein the linking density (i.e. a density of said linkings) increases, particularly monotonously, particularly strictly monotonously, and particularly continuously, from the surface into the volume of the polymer structure, so that a linking density gradient is formed/present.

According to an embodiment of the method according to the invention for generating a polymer structure, said linking reaction is controlled by applying one of: an electric current, a radiation, or by adding a compound being capable of linking said moieties, particularly a cross-linker that links said moieties.

Further, according to an embodiment of the method according to the invention for generating a polymer structure, said polymer chains are provided by polymerization of monomers (particularly, in the context of the present invention, polymerization refers to a process of reacting monomer molecules together in a chemical reaction to form polymer chains or three-dimensional networks), wherein each of said monomers comprises one of said moieties.

Further, according to an embodiment of the method according to the invention for generating a polymer structure, said polymer is provided in a solution, and said linking reaction is controlled by the pH of said solution, wherein particularly for controlling said pH an electrolysis-inducing current is applied to said solution using a first electrode covering said surface of the polymer structure at least partially or completely. Preferably, a current density in the range from 10 nA/mm$^2$ to 1 µA/mm$^2$ is used. This means in particular, that the flowing current is adjusted to obtain a desired current density which is scaled with the surface of the working electrode (e.g. first electrode or second electrode). According to an embodiment of the present invention, a preferred current density lies within the range from 0.05 µA/mm$^2$ to 0.15 µA/mm$^2$, particularly 0.075 µA/mm$^2$ to 0.0125 µA/mm$^2$, and particularly amounts to essentially 0.1 µA/mm$^2$.

The first electrode can assume anodic polarization or cathodic polarization, turning it into an anode or a cathode. A second electrode would assume the opposite polarity of the first electrode.

Further, according to an embodiment of the method according to the invention for generating a polymer structure, said linking reaction is performed or catalyzed by an enzyme, particularly a transglutaminase, more particularly a factor XIIIa (described by the UniProt Nr: P00488) or a precursor thereof. UniProt numbers refer to entries in the UniProt Knowledgebase.

Particularly, the reacting moieties of two polymer chains are an acyl (first moiety), particularly an amide, and an amine (second moiety).

Particularly, said first or said second moiety is a peptide comprising said acyl/amide or said amine.

Particularly, the enzyme is present in said polymer structure, particularly by adding the enzyme to the structure and/or solution.

Particularly, the enzymatic activity of said enzyme is controlled, particularly inhibited, by altering said pH of the solution locally, wherein particularly said enzyme converts said moieties of said polymer chains by means of forming a covalent bond between said moieties.

Particularly, for controlling said pH, an electrolysis-inducing current is applied to said solution using a first electrode covering said surface of the polymer structure at least in parts or completely (see above).

Further, according to an embodiment of the method according to the invention for generating a polymer structure, said polymer chains comprise or are formed as polyethylenglycol (PEG), particularly PEG with a molar weight in the range from 4000 Da to 100000 Da, particularly 40000 Da. Particularly, said PEG is an unbranched or branched PEG, wherein particularly the branched PEG comprises particularly 2, 3, 4 or eight arms.

According to a further aspect of the present invention a polymer structure, namely a polymer structure formed by at least a first polymer, wherein said structure comprises a volume and a surface (e.g. delimiting said volume, e.g. at least on one side, cf. also above), wherein said polymer comprises a plurality of polymer chains connected by linkings characterized by a linking density, wherein said linking density (i.e. a density of said linkings, see above) increases, particularly monotonously, particularly strictly monotonously, and particularly continuously from the surface into the volume (bulk) of the polymer structure so that a linking density gradient is formed/present, wherein the polymer structure is generated using the method according to the invention for generating a polymer structure.

According to a further aspect of the present invention, a device comprising:

a container for a polymer structure, and particularly the polymer structure itself, particularly the polymer structure according to the invention, which polymer structure is contained in said container, wherein the polymer structure comprises a linking density gradient.

According to an embodiment of the device according to the invention, the device comprises a first and a second electrode for controlling said pH in said solution by applying an electrolysis-inducing current to said solution. Particularly, the first and/or second electrode is coated with PLL-g-PEG.

Particularly, the container is made out of polydimethylsiloxane (PDMS). Further, particularly, the container comprises a circumferential wall extending from a bottom of the container so that the wall and the bottom delimit a chamber for receiving the polymer structure or the solution comprising the precursors of the polymer structure or hydrogel.

Particularly, the container comprises an open side so that the polymer structure or the solution comprising the precursors of the polymer structure or hydrogel in the chamber comprises an (e.g. upwardly facing) surface.

Particularly, the first electrode is designed to contact said surface. The volume of the polymer structure/solution (apart from the surface) is delimited by the container (i.e. by the wall and the bottom of the container). Particularly, the first electrode is designed to cover the first surface at least in portions, particularly completely.

Particularly, the second electrode (e.g. counter electrode) protrudes into the chamber through a recess in the wall of the container. Particularly, the second electrode extends along the bottom of the container and faces the first electrode. While the first electrode may comprise a two-dimensional, flat surface for contacting the polymer structure or the solution comprising the precursors of the polymer structure or hydrogel, the second electrode can have a longitudinal shape (e.g. elongated conductor/wire).

By means of the electrodes, a local change of pH of the solution can be achieved by the application of an electric current to the solution via said electrodes so that electrolysis of the solution is induced. Such a voltage-induced electrolysis results in a local pH decrease at the anodic electrode-solution interface and in a local pH increase at the cathodic-buffer interface.

The extent of the region around each electrode where a linking, cross-linking/polymerization of the precursors can be inhibited, confined or promoted, depends on the applied current density, pH and buffer capacity of the precursor solution in proximity of an electrode.

Further, according to an embodiment of the device according to the invention, the container may comprise a wall having two circumferential portions, wherein a first portion surrounds the chamber for receiving the polymer structure/solution, and wherein a second portion of the wall surrounds a further chamber for receiving a fluid, particularly saline solutions, buffer solutions, Chemo-attractant solution, growth-factor solution, cell suspension or mixture thereof and other solution having cell-responsive functions). Particularly, the second electrode (or first electrode) can be (slidably) arranged in a first and a second recess in said wall, which recesses face each other, so that the second electrode extends across the chamber, and closes said recesses, and particularly protrudes out of the container, wherein the second recess is in flow connection with the further chamber, so that—when the second electrode is removed from said second recess—a fluid stored in the further chamber can flow through said second recess into the first chamber, namely into a channel of the polymer structure/hydrogel being formed with help of the second electrode. Particularly, the second portion of the wall comprises a third recess being aligned with the second recess (and particularly the first recess), so that the second recess can be closed by inserting a closure means (e.g. rod) into the second recess via the third recess. In this embodiment, the two chambers are each also delimited by a bottom from which said portions of the wall extend, wherein the bottom of the first chamber may comprise a counter electrode (first electrode or second electrode) or may be formed as a counter electrode.

Further, according to an embodiment of the device according to the invention, the container may comprise a plurality of chambers for receiving the polymer structure/solution, so that high-throughput experiments can be performed using the device.

According to an embodiment of the device according to the invention, the polymer structure comprises a linking density gradient at a surface of the polymer structure that is not in contact with the container.

Further, according to an embodiment of the device according to the invention, the polymer structure comprises a channel in the polymer structure (e.g. generated as described above), particularly crossing the structure, and a linking density gradient at an interface (i.e. an inner surface of the structure) between the polymer structure and the lumen of said channel. Said gradient may be present at the whole interface between the lumen and the bulk or only at a segment or region of said interface. The gradient may be normal to the interface (surface) so that particularly the linking density is minimal or zero at the interface and increases towards the bulk (e.g. as described above). Thus the interface is soft while the stiffness of the structure increases towards the bulk surrounding the lumen of the channel.

Further, according to an embodiment of the device according to the invention, the polymer that comprises a surface comprising at least one recess (e.g. like pits, wells, invaginations and other complex shapes) and a linking density gradient at said surface at the location of the at least one recess.

Further, according to an embodiment of the device according to the invention, cells, particularly spheroids, microtissues and others forms of cell aggregates, are deposited in the at least one recess for promoting their invasion of the polymeric structure.

Further aspects of the present invention that may also be formulates as claims are stated below as items An aspect of the invention according to item 1 relates to a density gradient in a polymer extending from the surface where the density is 0% (interfacial density gradients) into the bulk reaching maximum crosslinking density of 100% in a distance range between 1 and 1000 μm.

Item 2: The density gradient according to item 1, wherein the gradient is formed electrochemically, using photochemistry or using diffusion of a cross-linker.

Item 3: The (interfacial) density gradient according to item 1 or 2 which is used to enhance cell penetration into the bulk of the polymer, particularly of cells seeded on the surface of the polymer.

Item 4: The density gradient of one of the items 1 to 3, wherein the polymer is natural (e.g. fibrin, alginate, chitosan, etc.) or synthetic (Polyethylene glycol, Polylactic acid, SU-8 and others).

Item 5: A composite polymeric structure (blend) featuring density gradients of different components spanning over different directions and different lengths, particularly according to one of the items 1 to 4.

Item 6: A device featuring a container for a polymer structure (made of any shape and made of plastics or metals) and a polymer structure, contained in such container featuring an interfacial density gradient, particularly according to one of the items 1 to 4, on the side of the is polymer not in contact with the container.

Item 7: A device featuring a container for a polymer structure (made of any shape and made of any plastic or metal) and a polymer structure contained in such container featuring a channel crossing said polymer structure and featuring a density gradient at the interface between the polymer structure and parts of or the whole lumen of the channel.

Item 8: A device featuring a container for a polymer structure (made of any shape and made of any plastic or metal) and a polymer structure contained in such container featuring a surface presenting pits, wells, invaginations and other complex shapes and featuring a density gradient at parts of or the whole surface of such complex shapes.

Item 9: A device described in claim 8, where cells (e.g. endothelial cells, mesenchymal stem cells and/or other cells), spheroids composed of one or more of this cell types, microtissues and others forms of cell aggregates are deposited in such pits, wells or invaginations to promote their invasion of the polymeric structure.

Item 10: A polymer structure of spherical, semi-spherical, cylindrical, ellipsoidal, pyramidal, cubical, cuboidal and prismatoidal shape featuring one or more density gradients on one or more of the sides of said structure or on parts of the surface of said structure.

Item 11: A polymer structure described in item 10 to be implanted in the body of animals to enhance cell penetration from the body of said animal into the polymer structure.

Item 12: A polymer structure described in item 10 to be used as permeable membrane for cells implemented in a cell impermeable material.

Item 13: Any of the polymer structures described above in which cells are embedded during the formation of said polymer structure.

BRIEF DESCRIPTION OF THE DRAWINGS

In the following further features, embodiments and examples of the present invention will be described with reference to the Figures. Wherein FIG. 1 schematically shows a representation of the experimental setup: approximately 50 μL PDMS chambers of a device according to the invention, accommodating the counter electrode (second electrode) in which the hydrogel precursors were poured; and on which a flat working electrode (first electrode) was placed during polymerization;

FIGS. 10A-10B show 3D reconstructions of stacks (100×5 μm stacks) acquired by LSCM of the constructs containing a bottom hydrogel with an engineered surface (102) (green), a second gel (101) (red) containing cells (100) (white); in FIG. 10A the surface of the bottom hydrogel was not engineered, while in FIG. 10B 1 μA/mm$^2$ was applied during polymerization;

FIGS. 11A-11D show disruption of the hydrogel when removal of the metal electrode when no current was applied. Schematic representation and photograph of the experimental phenomenon: electrode is placed on top of the chamber during polymerization and evaluation of gel disruption upon electrode removal: when no current was applied disrupted hydrogel stayed on the electrode (FIG. 11A), while no hydrogel was left when anodic currents were applied to the electrode (FIG. 11B). When electrodes were coated with PLL-g-PEG, gel adhesion to the surface could be prevented (FIG. 11C), which was not the case when using Teflon surfaces (FIG. 11D).

FIGS. 12A-12B show microbeads on 1 $\mu A/mm^2$ hydrogel surface. 3 µm and 20 µm diameter fluorescent beads (Fluoresbrite Plain YG, Polyscience Inc.) were poured on the hydrogel surface and left to sediment for 1 hour, and their distribution was monitored by acquiring 150 µm thick Z-stacks of the hydrogel surface using a SP5 confocal laser scanning microscope (Leica, Germany);

FIGS. 17A, 17C, 17E and 17G are 3D reconstructions of 250 µm thick stacks (consisting of 50 images acquired every 5 µm, unless for the 1.7% condition for which 125 images every 2 µm) acquired by LSCM, 3 days after seeding: cells formed a 2D sheet on the gel regardless of the stiffness. Cell morphology (top view, right column) show that cells respond to the gel stiffness by spreading more on stiffer gels, as shown in previous studies [20];

FIG. 27 shows another embodiment of the device according to the invention allowing for generating a channel in the polymer structure/hydrogel according to the invention.

DETAILED DESCRIPTION AND EXAMPLES

The present invention describes how to electrochemically modulate a PEG hydrogel surface 3 to form density gradients increasing towards the bulk (volume) 2. Previously, the possibility to locally inhibit the enzymatic crosslinking reaction of PEG hydrogels in the vicinity of electrodes by exploiting the acidic gradient at the anode-liquid interface generated upon electrolysis of water has been shown[7].

By placing an anodized electrode 21 at the surface 3 of the PEG precursor solution during polymerization, one can produce hydrogels 1 with surface density gradients. First, a confocal laser scanning microscopy was used to qualitatively describe the density gradients. Then, the mechanical properties of the hydrogel surfaces have been characterized by colloidal probe force spectroscopy. Finally, the enhanced penetration of human derived bone marrow mesenchymal stem cells (MSCs) from the electrochemically modulated hydrogel surface into the bulk using confocal laser scanning microscopy was shown.

Figure 1:
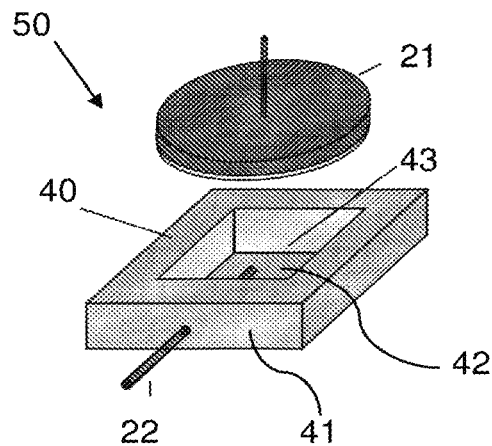

To perform all the experiments described here, devices 50 comprising a special polydimethylsiloxane (PDMS) mould (container) 40 accommodating a platinum counter electrode (second electrode) 22 and in which the PEG precursor solution was casted were designed (cf. FIG. 1). The container 40 comprises a circumferential wall 41 surrounding a chamber 43 which is delimited by a bottom 42.

Figure 2:
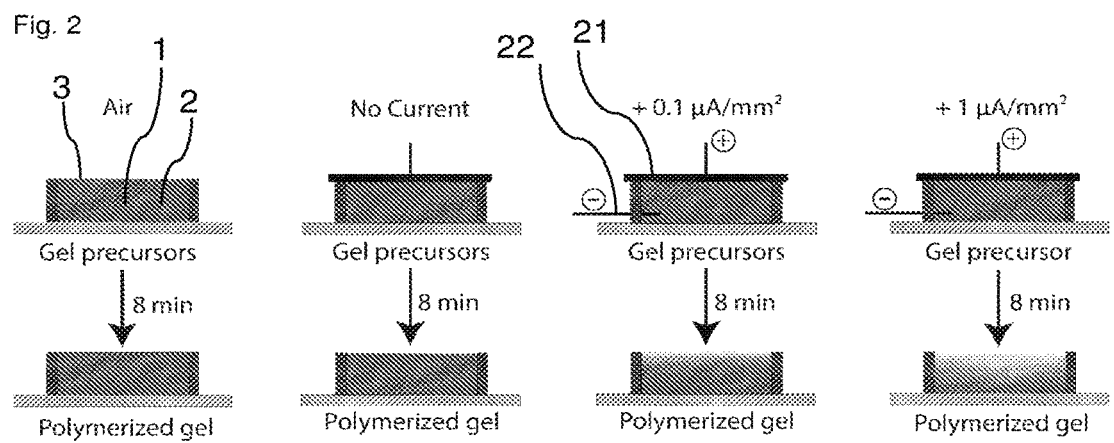
FIG. 2 shows a schematic representation of the hydrogel boundaries production: controls are left to be polymerized conventionally (Air-hydrogel), or covered with an anode to which no current, a low (0.1 μA/mm$^2$) or high current density (1 μA/mm$^2$) was imposed during polymerization.

The PEG monomers used here contained peptidic substrates previously described, which make possible the crosslinking of PEG via transglutamination (hence referred to as TG-PEG) [8]. The chamber 43 of the container 40 was covered with a flat gold electrode (first electrode) 21 during polymerization (cf. FIG. 1), which was anodized with different current densities to locally inhibit the enzymatic polymerization of TG-PEG (samples referred to as 0.1 $\mu A/mm^2$-hydrogel and 1 $\mu A/mm^2$-hydrogel). As a first control, the gel 1 was prepared in absence of the electrode 21, as conventionally done (from here referred to as Air-hydrogel). In order to account for the possible water evaporation at the surface of the gel, the gel precursors were covered with a gold surface without imposing any electric current during polymerization (from here referred to as No current-hydrogel, see FIG. 2). Because of the strong adhesion of the PEG hydrogel to gold and Teflon, the removal of any of these surfaces after polymerization resulted in the disruption of the gel (see FIGS. 11A and 11D). The gold surface (e.g. surface of the first electrode 21) was coated with a layer of PLL-g-PEG to drastically reduce the adhesion to PEG hydrogels 1 (see FIG. 11C). The adhesion was inhibited because the PEG chains extending from the gold surface did not contain the peptidic crosslinking substrate and therefore acted as an inert film. Coating the anode surface was not needed because the inhibited polymerization in its proximity is sufficient to eliminate the adhesion problem, as previously shown (FIG. 11B and [7]).

Figure 3:
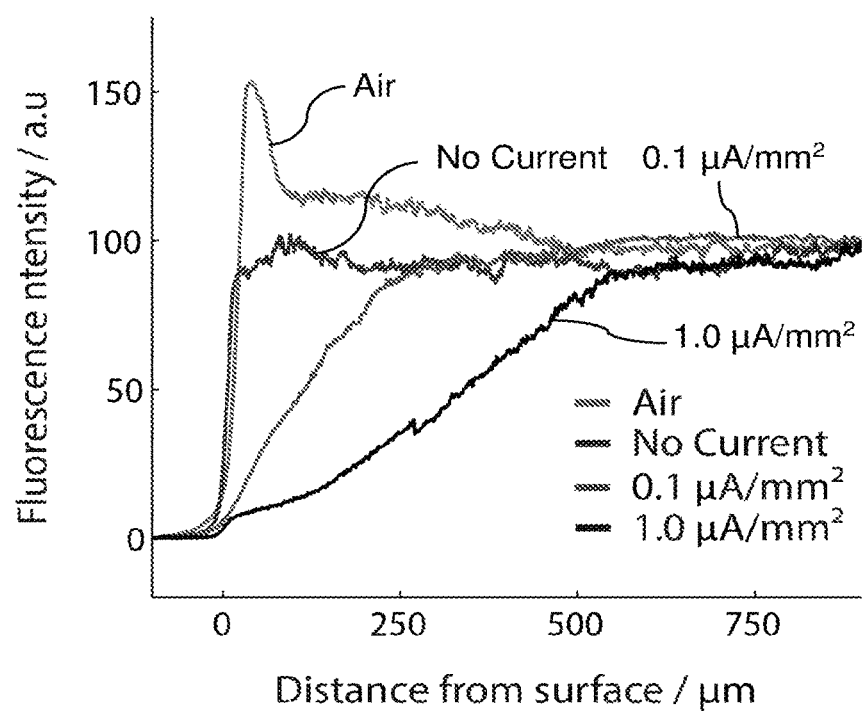
FIG. 3 shows fluorescence intensity profiles of FITC-tagged hydrogel boundaries prepared in air or covered with an electrode without current or with current densities varying from 0.1 to 1 μA/mm$^2$.
Figure 4:
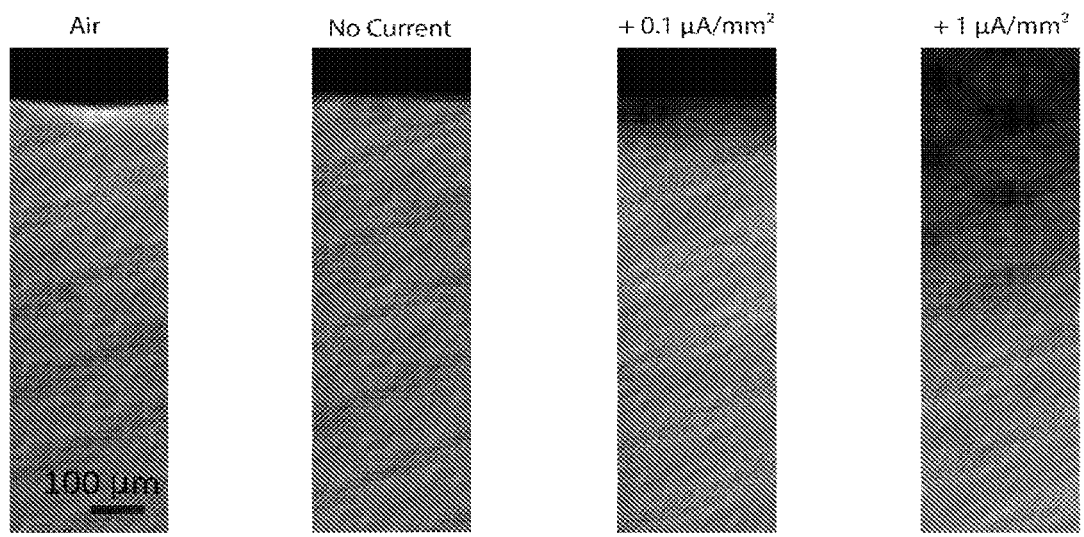
FIG. 4 shows corresponding representative confocal fluorescence images of FITC-tagged hydrogels boundaries.

To characterize the electrochemically engineered hydrogel surfaces 3, FITC-tagged Lys substrates (Lys-FITC) were admixed to TG-PEG hydrogel precursors. Since the fluorescent dye is covalently incorporated into the TG-PEG matrix by the same crosslinking reactions, the fluorescence signal is indicative of the crosslinking density [9]. Sections cut perpendicularly to the hydrogel surface 3 were inspected by confocal fluorescence microscopy. The surface boundaries produced in presence of anodic currents showed a gradient of intensity. In particular, the distance from the surface at which the fluorescence intensity reached a plateau increased from 250 µm (0.1 µA/mm$^2$-hydrogel) to 500 µm (1 µA/mm$^2$-hydrogel) (see FIGS. 3 and 4). These observations correlate with a previous study describing that gel polymerization is inhibited at the anode-liquid interface in a current dependent manner, due to the longer acidic gradient produced with increasing anodic currents [7]. The No current-hydrogel was characterized by a homogeneous signal intensity throughout the gel thickness, while the Air-hydrogel had a peak of fluorescence in the first 50 µm close to the surface. The interfacial increase of crosslinking density was presumably due to water evaporation during polymerization and consequent local increase of monomer concentration.

Figure 5:
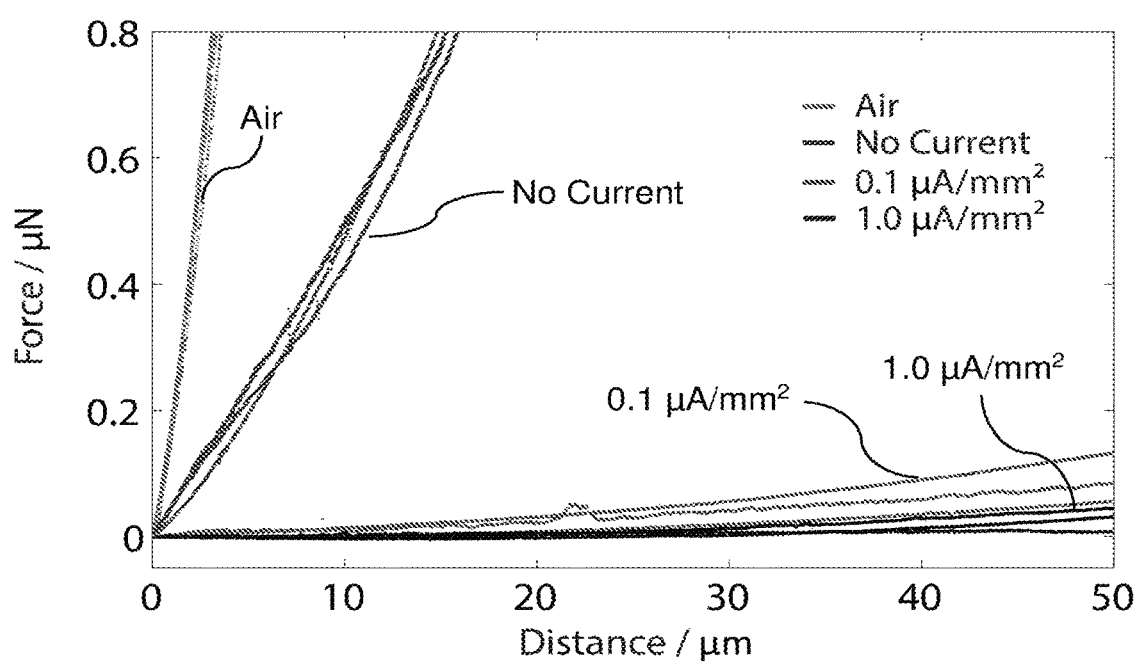
FIG. 5 shows mechanical characterization of the hydrogel boundary. Force-displacement measurements acquired by colloidal force spectroscopy of Air-, No current-, 0.1 μA/mm$^2$- and 1 μA/mm$^2$-hydrogel surfaces.

Because fluorescence measurements only provide good insights in changes of crosslinking within one sample; a colloidal probe force spectroscopy was used to compare the stiffness of the different hydrogel surfaces (see FIG. 5). To perform these measurements 50 µm beads 200 were dispersed on the surface of the hydrogels 1 and it was controlled that the beads remained on the surface and did not sink into the gel (see FIG. 12). Using a FluidFM® tipless cantilever, which is an AFM cantilever featuring an in-built microfluidic channel, a desired bead was approached, and after having applied a negative pressure to fix the bead to the tip of the cantilever, it was pressed into the gel 1. This method enables the acquisition of each force-distance curve with a fresh colloid, thus avoiding history effects coming from the probe [10]. FIG. 5 shows force-distance curves acquired by probing the upper surface of the hydrogels by pressing the bead into the gel. The Air-hydrogel presented the stiffest surface: the maximal measurable force (0.8 µN) was reached at a penetration of approximately 3.5 µm only. The No current-hydrogel presented a softer surface compared to the Air-hydrogel, reaching 0.8 µN with a penetration between 15 and 17 µm. This observation is in accordance with the fluorescence microscopy inspection, revealing the presence of a shell of higher crosslinking density in the Air-hydrogel. The surfaces of the hydrogels prepared electrochemically were considerably softer. In particular, the force-distance curves of the 0.1 µA/mm2-hydrogel reached between 0.05 and 0.13 µN at the maximal piezo displacement (50 µm) and for the 1 µA/mm$^2$-hydrogel forces always below 0.05 µN at 50 µm were measured. The softness of the gel surface appeared to increase with increasing currents.

Figure 13:
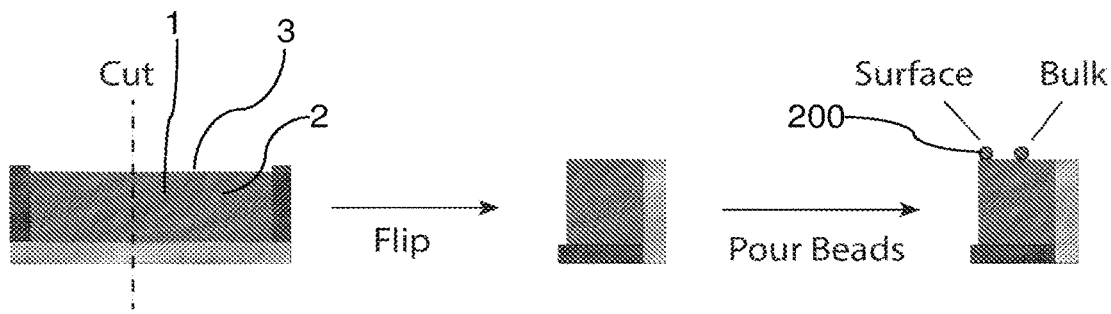
FIG. 13 shows a mechanical characterization of the hydrogel cross-section, particularly a schematic representation of the experimental setup: Hydrogels prepared as described previously were cut perpendicularly to the surface and flipped (cut showing upwards). 50 µm beads (200) were poured on the sections and used to probe the mechanical properties of the hydrogel at different positions.
Figure 14A:
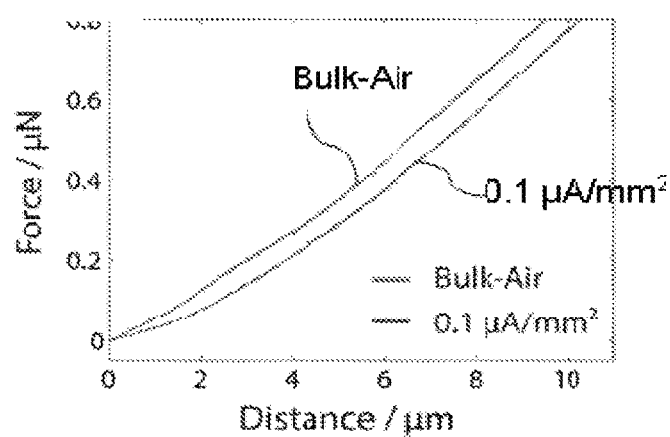
FIGS. 14A-14B and 15A-15B show representative force-displacement curves acquired on the bulk hydrogel (at least 500 µm from the surface) confirm that Air-hydrogel and 0.1 $\mu A/mm^2$-hydrogel have similar bulk mechanical properties (FIG. 14A). By comparing bulk and surface force-displacement curves, it was confirmed that the No current-hydrogel has homogenous mechanical properties (FIG. 15A), while the Air-hydrogel has a stiffer surface compared to the bulk (FIG. 14B), and the 0.1 $\mu A/mm^2$-hydrogel a softer surface compared to the bulk (FIG. 15B)
Figure 14B:
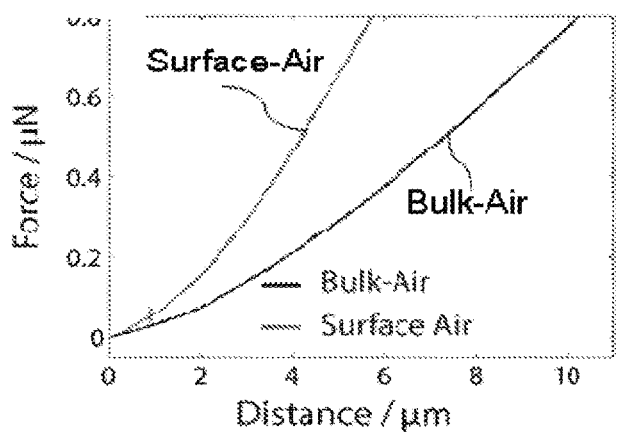
Figure 15A:
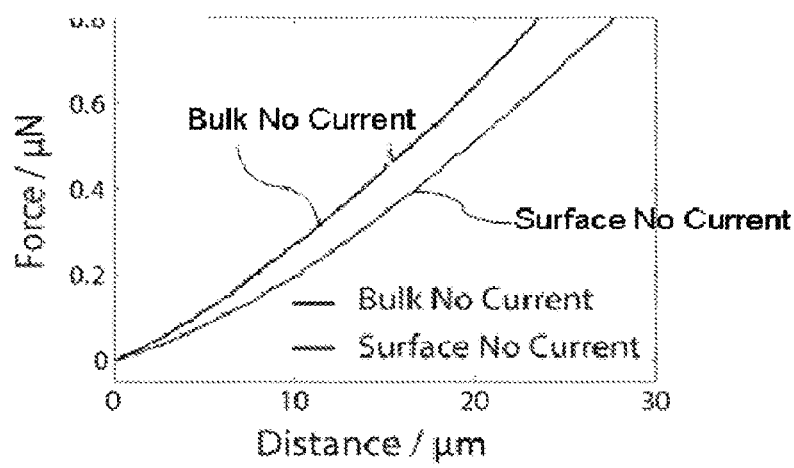
Figure 15B:
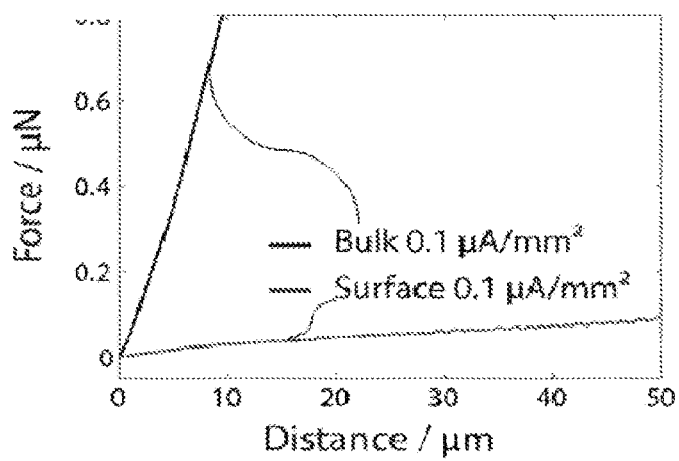

To get insights on how the surface (3) stiffness related to the bulk (2) stiffness, we sectioned the gels 1 perpendicularly to the surface 3 and probed the sections as close as possible to the surface and at least 500 µm away from it (bulk), (see FIG. 13). The stiffness measured on the sections was systematically lower than the stiffness observed in FIG. 5 most likely because the probed surface was in direct contact with the cutting blade, which introduced cracks and other artifacts. Nevertheless, the equal preparation of the sections allowed confirming a few important observations. Comparable force-distance curves for the bulk of the 0.1 µA/mm$^2$-hydrogel and Air-hydrogel were measured, indicating that the electrochemical surface modification did not affect the bulk properties of the matrix (FIG. 14A). Additionally, this experiment confirmed that the No current-hydrogel was homogenous in stiffness (FIG. 15A), that the Air-hydrogel showed a stiffer surface than the bulk (FIG. 14B) and that the 0.1 µA/mm$^2$-hydrogel had a softer surface than the bulk (FIG. 15B).

Figure 6A:
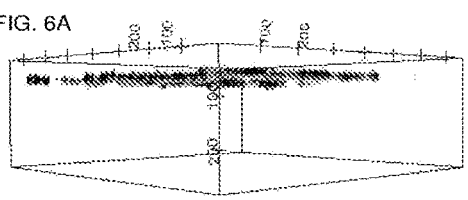
FIGS. 6A-6H show cell infiltration in the engineered hydrogel surface 1 day (FIGS. 6A, 6C, 6E and 6G) and 3 days (FIGS. 6B, 6D, 6F and 6H) after cell seeding on top of the engineered surfaces. Hydrogel surfaces were produced in absence of electrodes (FIGS. 6A and 6B), or covered with an anode, without imposing any current (FIGS. 6C and 6D) or applying 0.1 μA/mm$^2$ (FIGS. 6E and 6F) and 1 μA/mm$^2$ (FIGS. 6G and 6H)
Figure 6B:
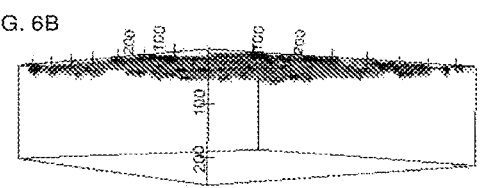
Figure 6C:
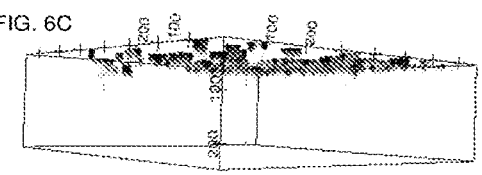
Figure 6D:
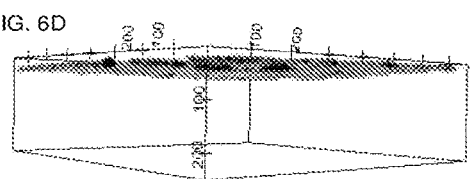
Figure 6E:
Figure 6F:
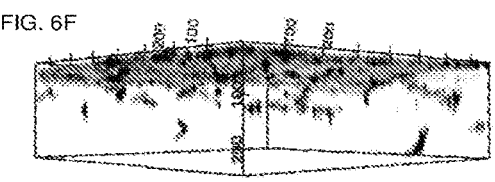
Figure 6G:
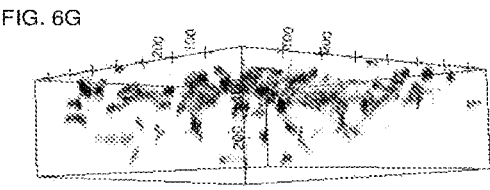
Figure 6H:
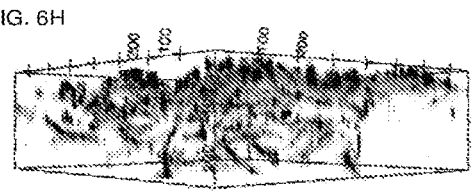
Figure 7A:
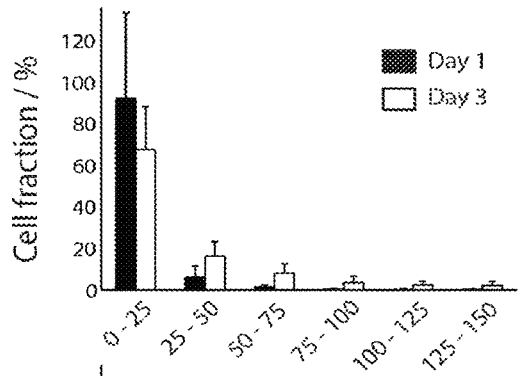
FIGS. 7A-7D show cell infiltration that was quantified 1 day and 3 days after seeding, by analyzing the fraction of cells at different depth in the hydrogel (FIGS. 7A, 7B, 7C and 7D). Averages and standard deviations (n=3) are presented.
Figure 7B:
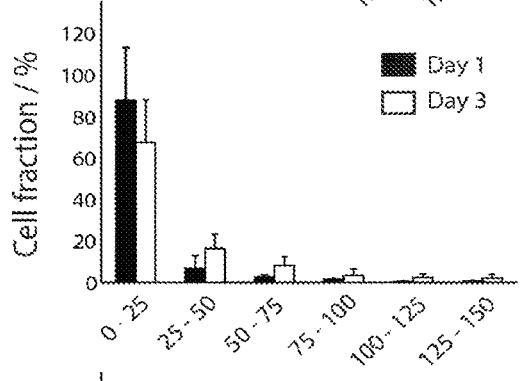
Figure 7C:
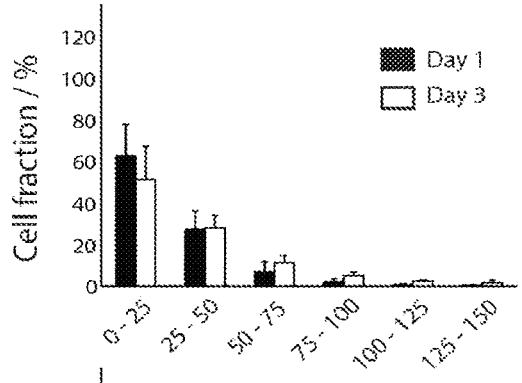
Figure 7D:
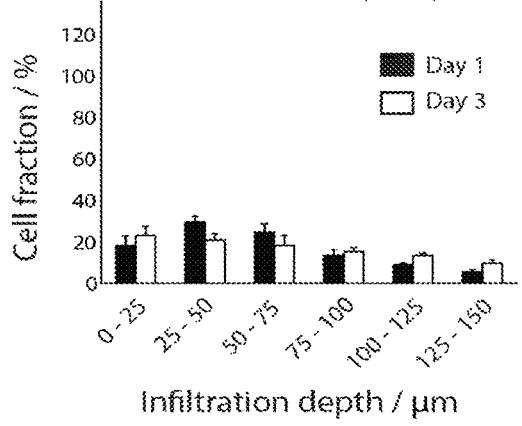
Figure 16:
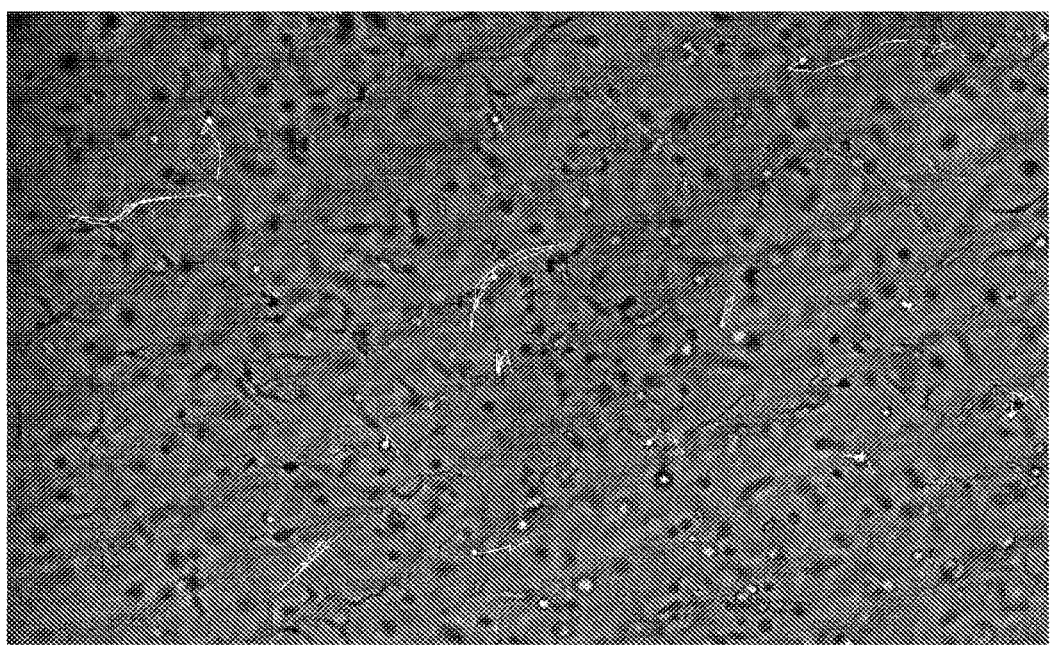
FIG. 16 shows cell migration within the hydrogel. MSCs were embedded in TG-PEG hydrogels (final concentration: 0.5×106 ml−1). For migration assays, three random positions were selected using an inverted microscope (Leica DM16000 B) equipped with a motorized focus and stage and images were acquired every 20 min for 24 hours. Cell migration was followed for 24 hours using the manual tracking plugin in ImageJ. 30 tracked cells had an average migration of 226±44 µm in 24 h.

After the characterization of the hydrogel surfaces, the ability of cells 100 seeded onto them to penetrate into the hydrogel bulk 2 were assessed. In particular, human derived bone marrow MSCs were seeded on top of the engineered gel surfaces and the cell distribution within the first 150 µm of the hydrogel was assessed after 1 and 3 days in culture using confocal laser scanning microscopy (see FIGS. 6 and 7). The gel formulation chosen for this study was previously shown to support migration of embedded cells [11] and this was confirmed for the culture conditions used here (see FIG. 16). Cells seeded on both Air- and No current-hydrogels grew in 2D forming a monolayer and thus were almost exclusively located in the first 50 µm after 1 and 3 days (see FIGS. 6A, 6B, 6C, 6D and FIGS. 7A and 7B. When placed on the electrochemically engineered hydrogel surfaces, cells could penetrate into the gel. Furthermore, the penetration depth increased with increasing current density. In particular, cells could penetrate more than 150 µm into the gels prepared with the highest current density after 1 day already (FIG. 6G and FIG. 7D). The cell distribution after 3 days was quite homogenous within the first 150 µm from the gel surface (see FIG. 6H and FIG. 7D).

Figure 17:
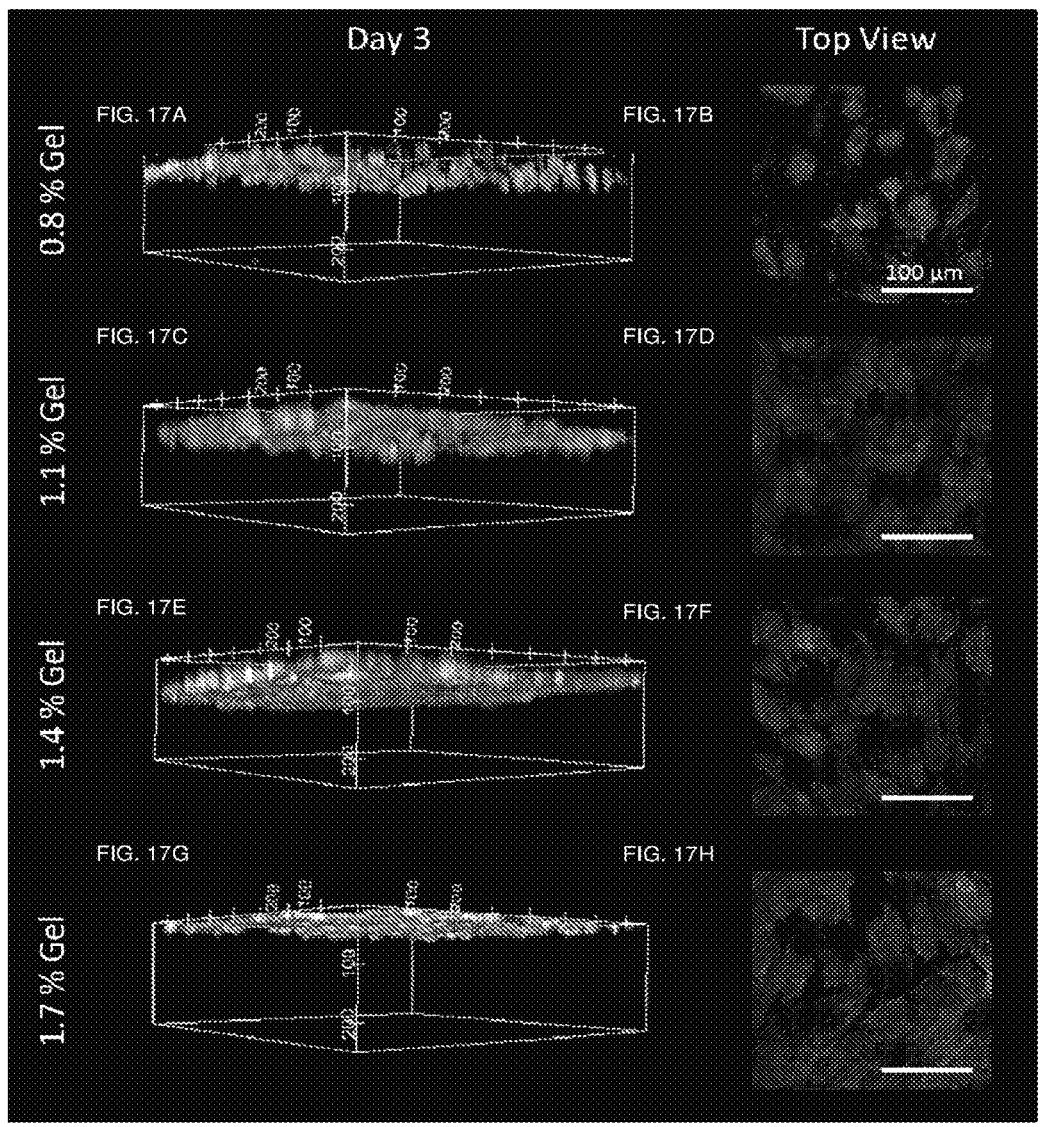
FIGS. 17A-H show cells seeded on softer hydrogels. Human derived bone marrow MSCs were seeded on PEG gels prepared conventionally (in absence of electrode during polymerization) with lower PEG densities (respectively 0.8%, 1.1%, 1.4% and 1.7%).

These results show that a crosslinking density gradient increasing from the surface 3 to the bulk 2 of the hydrogel 1 enhanced cell penetration of cells seeded on the surfaces. Homogeneously reducing the stiffness of the gels was not sufficient to enhance cell penetration. In fact, even softer gels that were produced (0.8% PEG), did not allow for cell penetration from the surface into the bulk of the hydrogel after 3 days (FIG. 17). Cells are known to move along density gradients from soft to stiff regions, by a phenomenon referred as durotaxis [12], also in 3D hydrogels [13]. Anseth and colleagues produced PEG-hydrogels with soft and stiff regions with a sharp interface. Interestingly, while cells were motile regardless of the stiffness of the hydrogels, cells were not able to migrate from the soft to the stiff region and would instead migrate backwards or align along the interface [14]. It indicates that a gradual—and not sharp—increase of stiffness favor durotaxis.

Hydrogel permeability to cells or tissue is an important challenge in the development of functional scaffolds for tissue engineering and other strategies have been explored. For instance, Wylie et al. observed that on similar RGD-functionalized synthetic hydrogels neural precursor cell infiltration was very limited, not exceeding 20 µm after 14 days. The authors enhanced cell penetration up to 85 µm after 2 weeks by creating a gradient of SHH (Sonic Hedge-Hog) spanning from the surface into the bulk of the hydrogel using photopatterning. This approach is very elegant, however it requires longer manufacturing times [3]. The use of different cells, culture conditions and matrices do not allow for a direct comparison of the results. A number of researchers pursued other ways to overcome the infiltration problems and developed scaffold fabrication strategies for improving cellular or tissue infiltration by creating macro-pores in the hydrogels (reviewed in [15]). While macro-pores inclusion has been shown to effectively improve cell or tissue infiltration in a variety of both natural hydrogels, i.e. collagen [6a], gelatin [6b], and synthetic hydrogels, i.e. Poly(ethylene Glycol) (PEG) [5, 6c], all these techniques nevertheless alter the bulk properties of the constructs and provide little or no spatial control over fabricated microarchitecture [16].

Post-processing cell seeding is not the only occurrence during hydrogel boundaries can present a barrier. Constructs produced by additive manufacturing feature interfaces between individually added elements. While it was shown repeatedly that cell and matrix components could be precisely deposited forming heterogeneously organized and viable constructs resembling native tissues [17], the interface between the assembled elements was so far mostly overlooked and the question how cells sense and respond to this interface remains elusive. Bordeleau et al. are among the few addressing this issue; the authors sequentially polymerized cell containing collagen gels varying in density on top of each other, and showed that cells do not migrate from a soft gel to a stiffer one, and could only migrate from a stiff gel to a softer one in very rare occurrences [18]. This observation indicates that also for additive manufacturing, the gel boundary represents a barrier to cells invasion, potentially leading to the compartmentalization of individually added elements. The approach described in this work could also be beneficial for such applications.

Figure 8:
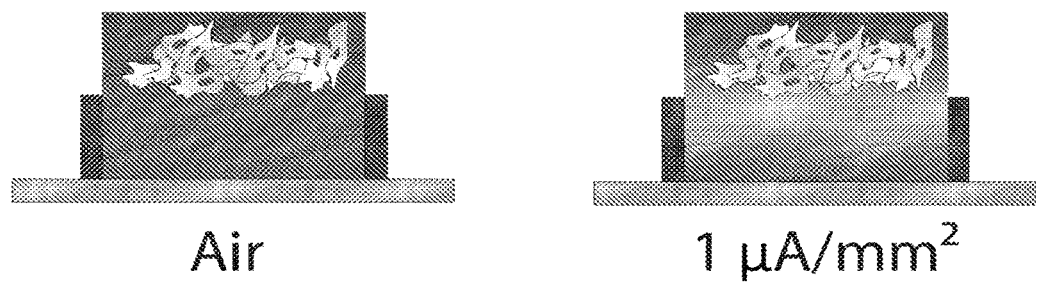
FIG. 8 shows engineering of a hydrogel-hydrogel interface. To emulate additive manufacturing, a gel containing cells was poured on top of hydrogels with engineered surfaces: air (left) and 1 μA/mm$^2$ (right)
Figure 9:
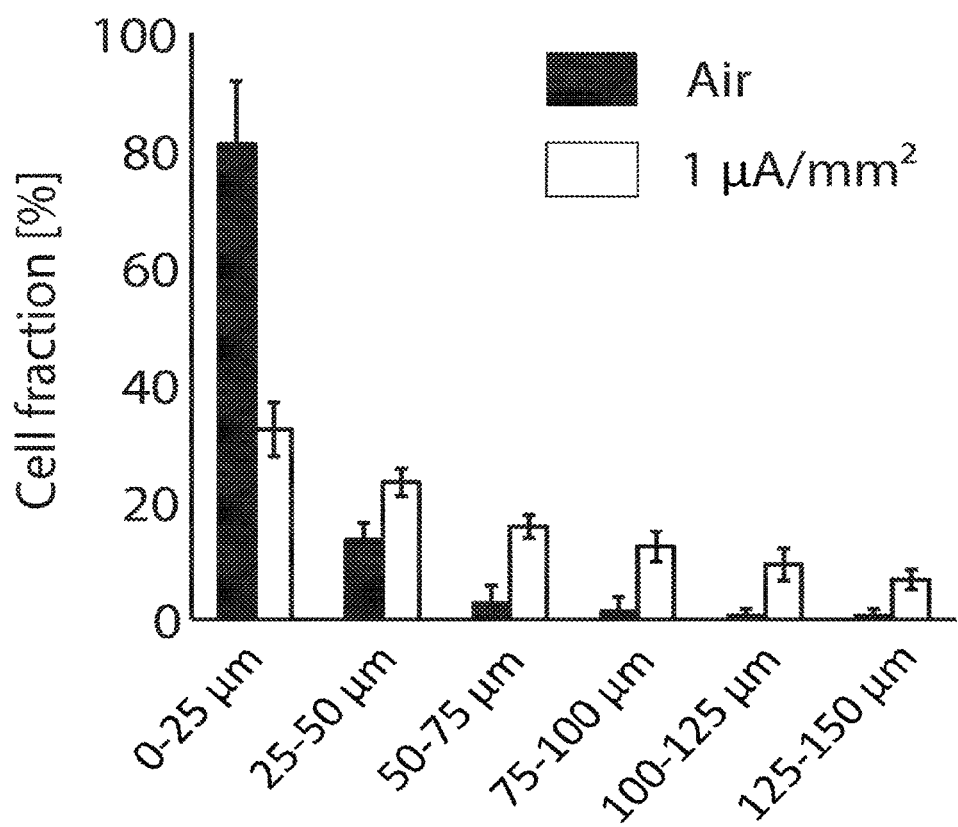
FIG. 9 shows cell infiltration from the top gel in the bottom hydrogel that was quantified at day 3, by analyzing the fraction of cells at different depth in the bottom hydrogel.

To investigate the interface between two gels, an Air-hydrogel and a 1 µA/mm2-hydrogel was produced. on top of which a second Alexa 561-labelled gel containing MSCs was polymerized (see FIG. 8). After 3 days of culture, cells could not cross the interface of the Air-hydrogel, while cells invaded the electrochemically engineered gel (see FIG. 9 and FIG. 10A). Researchers have shown that additive manufacturing is very promising and how critical the interface between added elements can be. Here, a strategy is proposed to engineer such interfaces to reduce cell compartmentalization.

In conclusion, by electrochemically controlling the enzymatic crosslinking of the hydrogel surface density gradients can be produced that enhance cell permeability in the hydrogel bulk. Electrochemically generated surface gradients hold great promise for enabling topical cell seeding on processed hydrogels and cell migration through the interface of adjacent hydrogels additively manufactured.

Further Examples

Preparation of the PDMS frames (container of the device according to the invention). Polydimethylsiloxane (PDMS) frames were made as follows: the silicon elastomer and the curing agent (Sylgard 184, Dow Corning Corporation, USA) were mixed (10:1 in mass) at 2000 rpm for 3 min in a ARE-250 mixer (Thinky Corporation, Japan). The mixture was subsequently poured into poly(methyl methacrylate) (PMMA) molds, where a 500 µm in diameter stainless steel wire was positioned to create the holes for the future counter electrode. The mixture was subsequently degassed for 30 min in a vacuum chamber and baked for 4 h at 60° C. Stainless steel wire and PDMS forms were removed from the PMMA molds rinsed with isopropanol (IPA) and MilliQ water.

Preparation of TG-PEG Hydrogels: Metalloprotease (MMP)-sensitive TG-PEG hydrogels were prepared as described previously [19]. In brief, eight-arm PEG precursors containing the pending factor XIIIa substrate peptides glutamine acceptor (n-PEG-Gln) or lysine donor with an additional MMP-sensitive linker (n-PEG-MMPsensitive-Lys) were mixed stoichiometrically (final dry mass content 1.7%) in Tris-Buffer (TBS, 50 mM, pH 7.6) containing 50 mM calcium chloride. Lys-FITC, Gln-Alexa 561, Gln-RGD or combinations were added to the precursor solution prior to initiation of cross-linking by 10 U/mL thrombin-activated FXIIIa and vigorous mixing.

Electrochemical control of TG-PEG polymerization. The precursors mixture was immediately poured in the PDMS frame accommodating a platinum wire (0.5 mm in diameter, Alfa Aesar, Ward Hill, USA) used as auxiliary electrode. Cobalt-chromium disks (15 mm in diameter and 0.8 mm in thickness) evaporated 10 nm chromium and 200 nm gold were used as working electrode to be placed on top of the PDMS chamber. The polymerization of the TG-PEG was allowed to progress during 8 minutes in presence of a DC current applied in galvanostatic mode. The current density was 100 nA/mm$^2$ or 1 µA/mm$^2$.

Cell culture: Human bone marrow MSCs were cultured in minimal essential medium alpha (MEMalpha, Gibco Life Technologies, cat. no. 22571-020) supplemented with 10% (v/v) fetal calf serum (FCS, Gibco Life Technologies, cat. no. 10500), 1% (v/v) penicillin/streptomycin solution (Gibco Life Technologies, cat. no. 15140-122), 5 ng/mL FGF-2 (Peprotech, cat. no. 100-18B) and 50 nM PDGF (Peprotech, cat. no. 100-14B).

Gel penetration: MSCs were seeded onto hydrogel surfaces and kept in culture for 1 or 3 days. At each time point, cells were fixed with samples were fixed with 4% paraformaldehyde, rinsed three times and kept in PBS until staining.

Penetration across the gel-gel interface: Cells suspensions were diluted in the respective medium and added to the complete TG-PEG solution (containing Gln-Alexa 561). Cell containing gels were poured on top of hydrogels produced with an engineered surface and the assembled construct was placed in culture for 1 or 3 days. At each time point, cells were fixed with samples were fixed with 4% paraformaldehyde, rinsed three times and kept in PBS until staining.

Confocal laser scanning microscopy of cells in hydrogels: Permeabilization was performed for 30 min at room temperature with 0.1% Triton X-100 in PBS followed by 2 washing steps with PBS. For f-actin staining, samples were incubated over night at 4° C. with Alexa 633-labeled phalloidin (Molecular Probes, cat. no. A22284). Afterwards, samples were washed 3 times with PBS before analysis with either confocal laser scanning microscopy. The TG-PEG hydrogels and cells were imaged using a SP5 confocal laser scanning microscope (Leica, Germany). At least 3 samples per condition were analyzed and 3 regions per sample were acquired.

Infiltration quantification: Stacks (125×2 µm) acquired by LSCM were reconstructed in 3D, and a side projection was performed. The FITC channel was used to determine the gel surface and the alexa-633 channel was used to determine the position of cells in the gel cross-section. A threshold was applied to the alexa-633 channel images, which were subsequently cleaned (noise removal) and segmented into regions of 25 µm thick starting from the gel surface. The amount of positive pixels was quantified in each region as a representation of the cell number. The ratio of cells in each section was calculated as a percentage of the overall amount of cells in the sample. The values represent mean values±standard deviation of at least 3 scaffolds per time point, in which at least 3 regions were analyzed.

The devices according to the invention used for receiving the polymer structure/hydrogel to be produced can take various forms and shapes.

Figure 18:
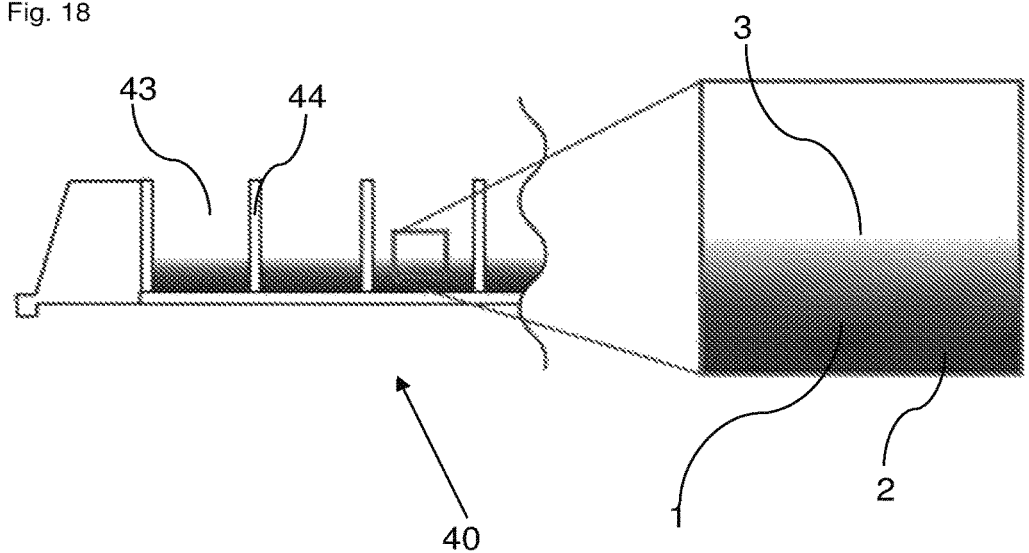
FIG. 18 shows a device according to the invention comprising several chambers for receiving the polymer structure/hydrogel according to the invention.

According to FIG. 18, a container 40 of such a device may comprise a plurality of chambers 43 of e.g. identical shape for a massive parallelization of experiments. The chambers 43 may be separated by wells 44. Here, the free (upper) surface 3 of the polymer structure 1 generated in the individual chambers 43 as described above may exhibit the linking density gradient so that a soft surface 3 is generated while the stiffness of the structure 1 (and the linking density gradient) increases towards the bulk/volume 2 of the structure 1.

According to FIGS. 19 to 26, the polymer structure contained in the container may exhibits one or several recesses (pits, wells etc.)

Figure 19:
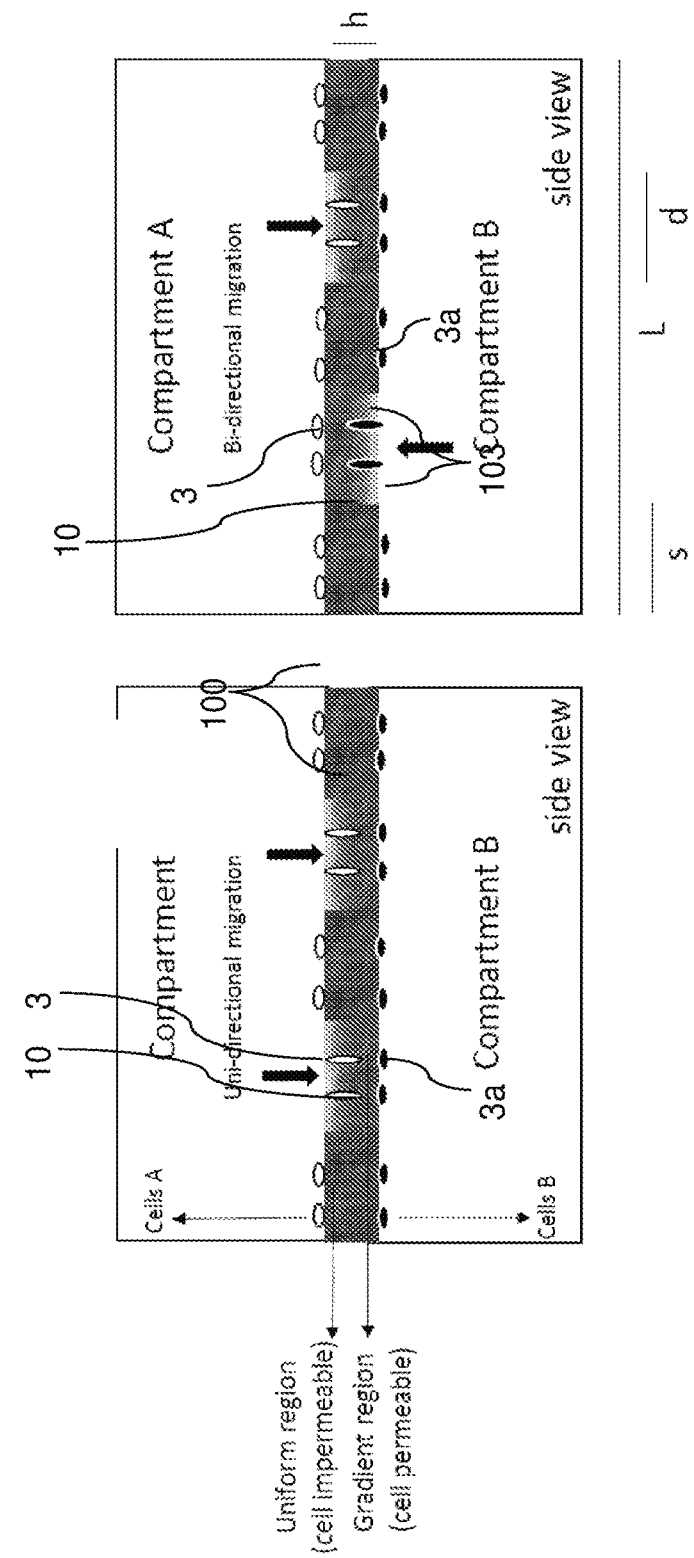
FIG. 19-26 shows embodiments (possible geometries) of polymer structures according to the invention having e.g. recesses, channels (e.g. microchannels etc. as well as embodiments of polymer structures having the shape of e.g. a sphere etc.

FIG. 19 shows an arrangement of a polymer structure in the form of a (polymer-) hydrogel membrane 10 featuring permeable and/or impermeable compartments A, B (wherein the membrane 10 separates said compartments A, B) for directional migration of cells 100 (103) from one surface 3 (3a) to another surface 3a (3). Thickness h can be in the range of 100 µm to several centimetres. The length L and width can be in the range between 100 µm and several centimetres. The length and width of the impermeable region s and of the permeable region d can be the same or different and can be in the range of 1 µm to several centimetres.

Figure 20:
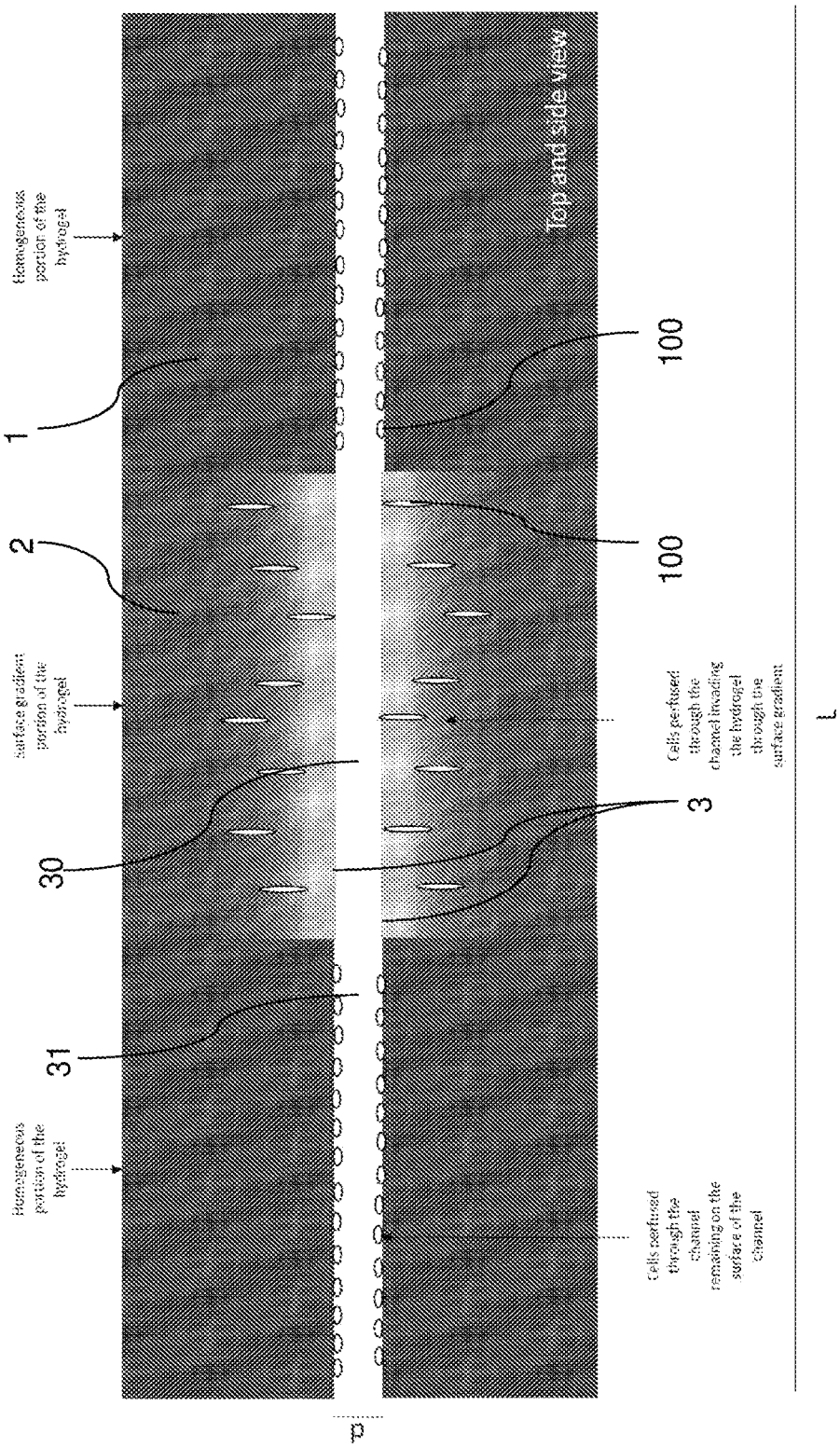

FIG. 20 shows a recess 30 in the form of a channel (e.g. microchannel) 30 created through a hydrogel 1 with a portion of the inner surface 3 of the polymer structure 1 in contact with the lumen 31 featuring a (linking density) gradient (i.e. said surface 3 forms an interface between lumen 31 and polymer structure 1). Cells 100 perfused through said channel 30 will invade the hydrogel bulk 2 from this region only. The diameter of the microchannel 30 can be in the range of 10 µm to several centimetres. The most interesting range is 10 µm to 1000 µm. The length L of the channel 30 can be in the range of 100 µm to several centimetres.

Figure 21:
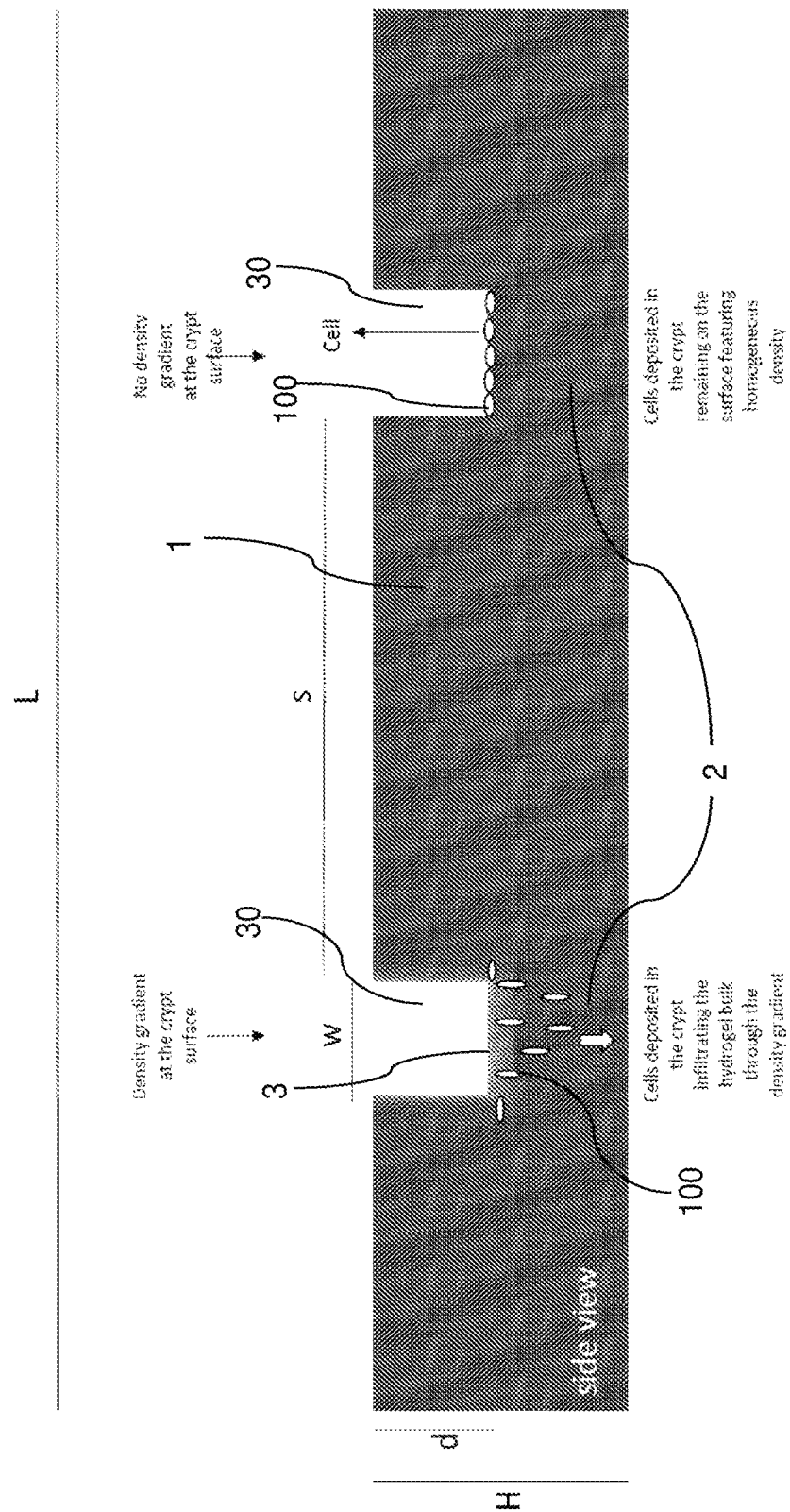

FIG. 21 shows recesses 30 in form of wells (e.g. rectangular wells), particularly microwells, crypts or invaginations in a hydrogel 1 used to dispense cells 100 or cell aggregates 100. Cells 100 can invade the bulk 2 of the hydrogel 1 only from the crypts or wells 30 featuring the density gradient at the surface 3 (forming e.g. the bottom of the respective well 30), wherein the linking density is minimal or zero at the surface 3 and increase towards its maximum the bulk/volume 2. The well 30 can be of any shape (cubical, cuboidal, pyramidal, cylindrical, semi-spherical, ellipsoidal and prismatoidal), represented here is cuboidal (i.e. rectangular cross section). The depth d, width w and length of the well 30 can be in the range of 10 µm to several millimetres. The separation between the wells 30 s can be in the range of 10 µm to several millimetres. The thickness H, length L and width of the hydrogel (polymer structure) 1 can be in the range of 100 µm to several centimetres.

Figure 22:
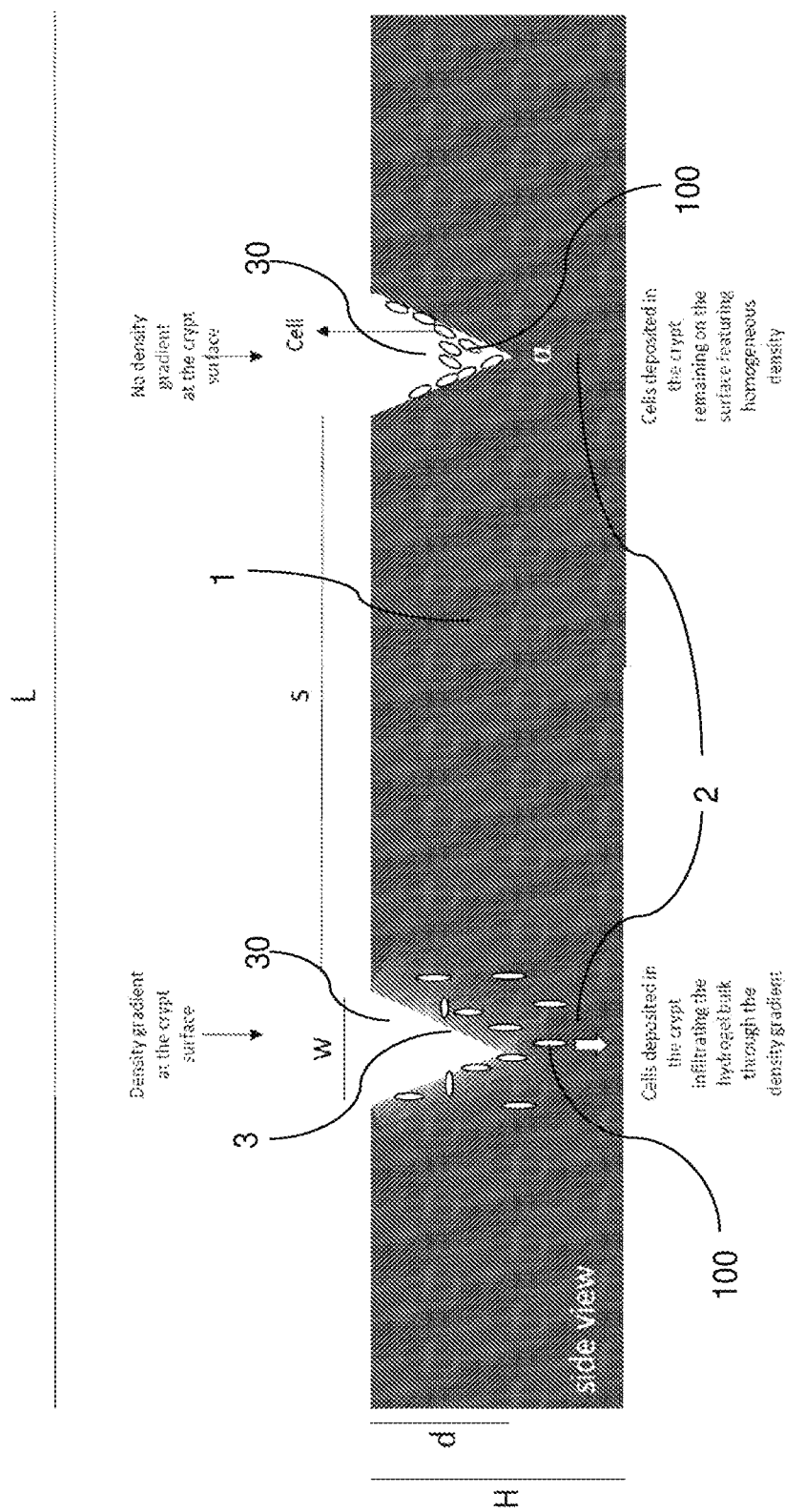

FIG. 22 shows a polymer structure (e.g. hydrogel) 1 comprising recesses 30 in the form of wells (e.g. microwells), crypts or invaginations in the hydrogel 1 used to dispense cells 100 or cell aggregates 100. Cells 100 can invade the bulk 2 of the hydrogel 1 only from the crypts or wells 30 featuring the density gradient at the surface 3 delimiting the respective recess (well) 30. Again, the well 30 can be of any shape (cubical, cuboidal, pyramidal, cylindrical, semi-spherical, ellipsoidal and prismatoidal), represented here is pyramidal. The depth d, width w and length of the well 30 can be in the range of 10 µm to several millimetres. The separation s between the wells 30 can be in the range of 10 µm to several millimetres. The thickness H, length L and width of the hydrogel 1 can be in the range of 100 µm to several centimetres. The angle α of the pyramidal well can vary between 10° and 180°.

Figure 23:
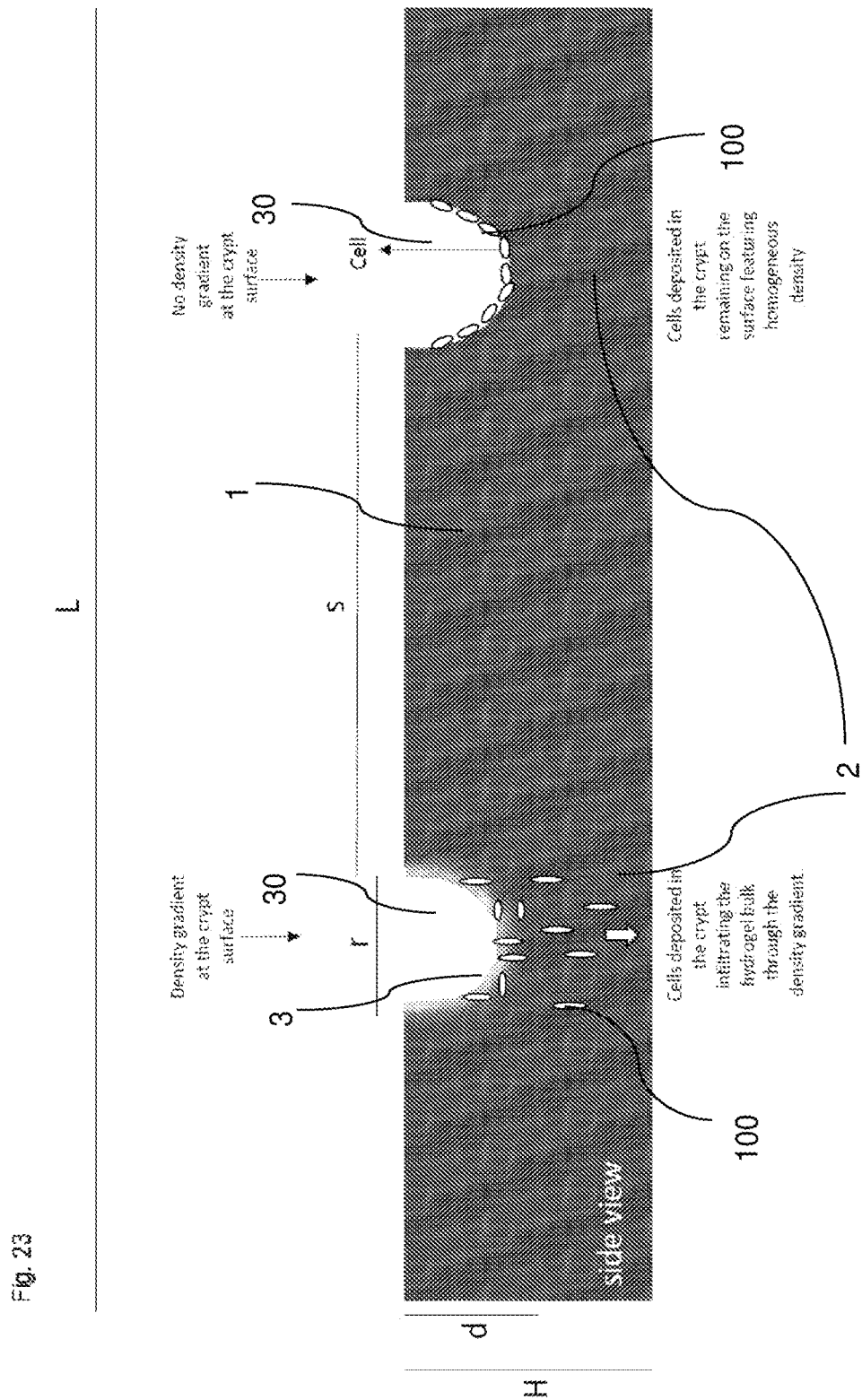

FIG. 23 shows recesses (e.g. microwells) 30, crypts or invaginations in a hydrogel 1 used to dispense cells 100 or cell aggregates 100. Cells 100 can invade the bulk 2 of the hydrogel 1 only from the crypts or wells 30 featuring the (linking density) gradient at the surface 3 delimiting the well 30. Again, the well 30 can be of any shape (cubical, cuboidal, pyramidal, cylindrical, semi-spherical, ellipsoidal and prismatoidal), represented here is semi-spherical or ellipsoidal shape. The depth d and radius r of the well 30 can be in the range of 10 µm to several millimetres. The separation s between the wells 30 can be in the range of 10 µm to several millimetres. The thickness H, length L and width of the hydrogel (polymer structure) 1 can be in the range of 100 µm to several centimetres.

Figure 24:
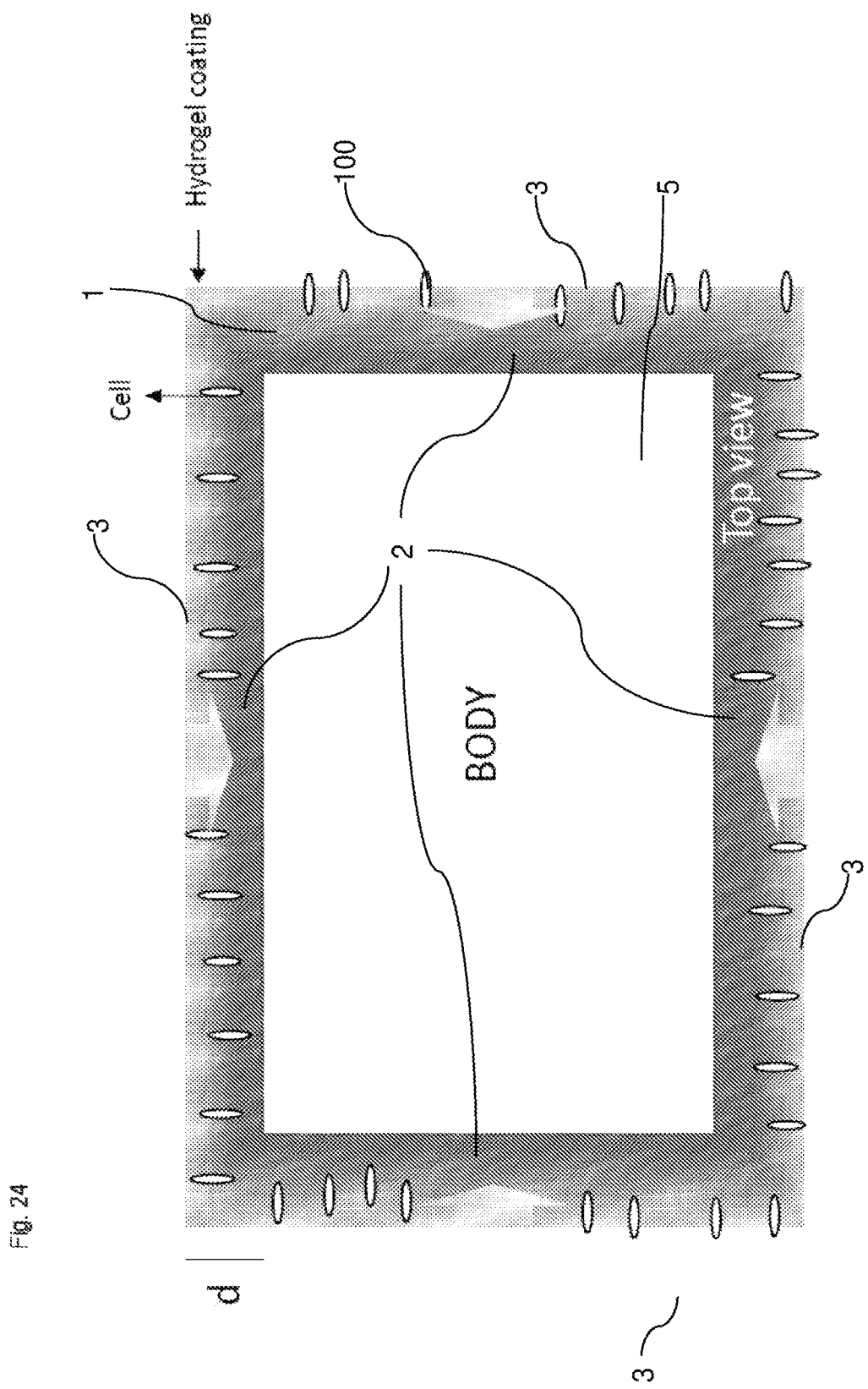

FIG. 24 shows a polymer structure 1 in the form of a hydrogel coating (thickness d may vary from 10 µm to several millimetres) of a body (e.g. an implant or a device of any shape and size) featuring a density gradient at the surface 3 to promote 3D cell infiltration of cells 100 in the coating and/or avoid cell spreading in 2D on the surface 3. 2D cell spreading on the surface 3 of a body 5 is among the first steps of the foreign body response and thus this coating could prevent foreign body response.

Figure 25:
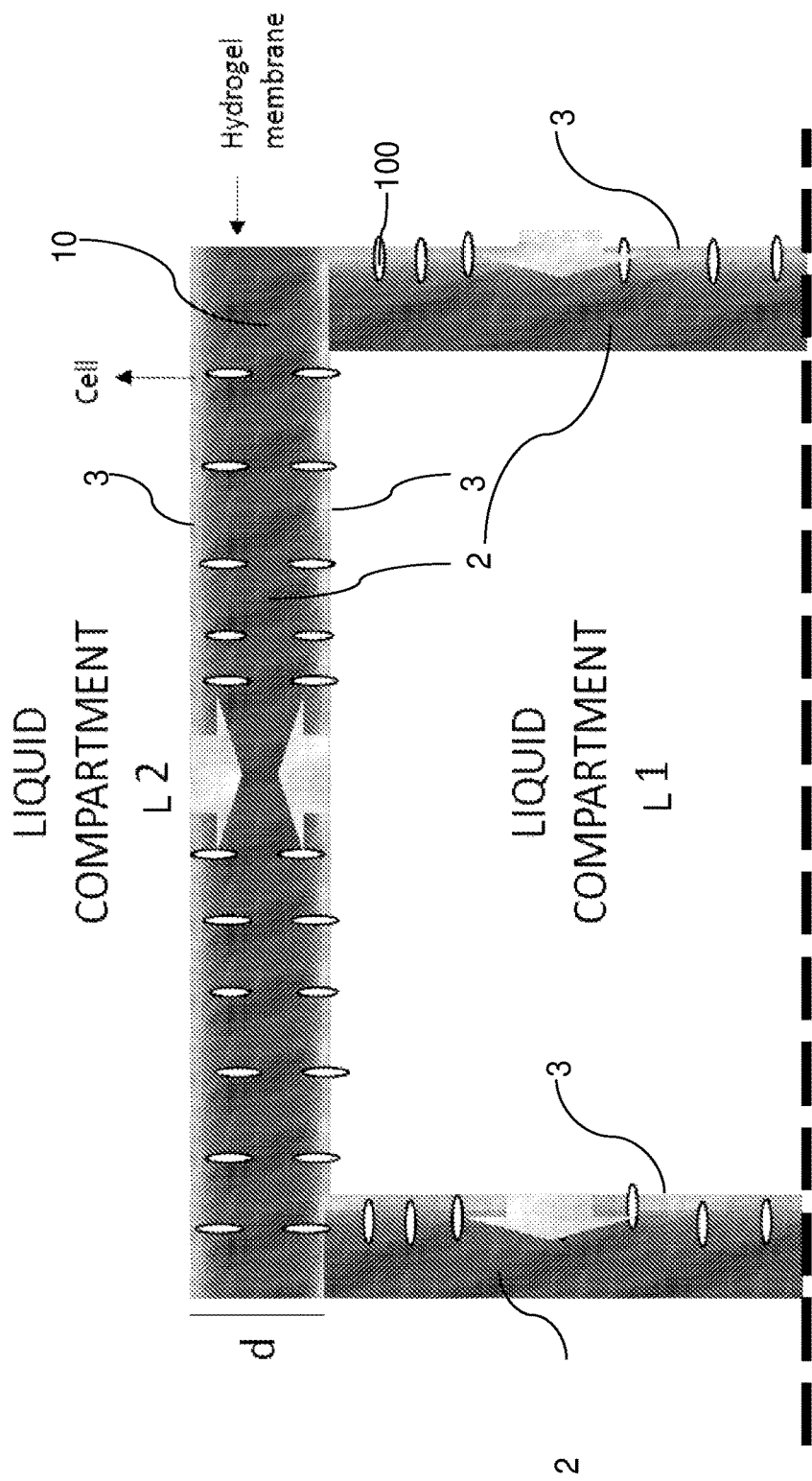

FIG. 25 shows another polymer structure 10 in the form of a hydrogel membrane (thickness d may vary from 10 µm to several millimetres) separating two liquid compartments L1, L2 and allowing directional cell invasion of cells 100 in the membrane 10 from one or both compartments L1, L2.

Figure 26:
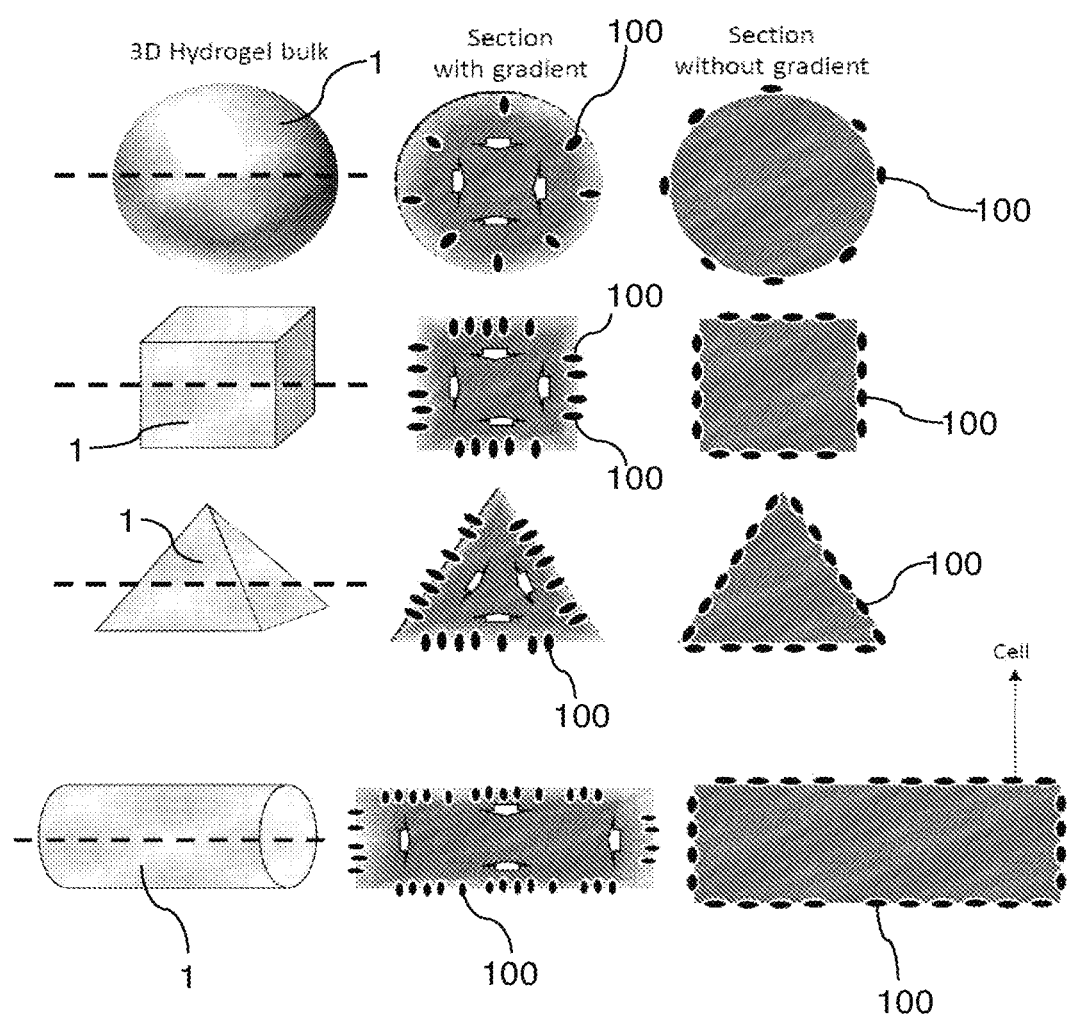

FIG. 26 shows polymer structures 1 (hydrogel bodies) of any shape (spherical, semi-spherical, cylindrical, ellipsoidal, pyramidal, cubical, cuboidal and prismatoidal), here represented spherical, cubical, pyramidal and cylindrical, featuring a density gradient increasing towards the center of the respective body 1 and having this gradient being present on one or more faces (surfaces) of the respective body 1. These bodies 1 can e.g. be implanted as implants in animals and promote cell infiltration inside the implant's bulk.

Particularly in the embodiments shown in FIGS. 20 to 23 the working electrode (e.g. first or second electrode) for generating the respective linking density gradient will be incorporated in a metal head of the shape of respective the recess 30. The counter electrode (e.g. second or first electrode) can be arranged in the polymer structure (i.e. in the chamber) as also described above.

Further, as shown in FIG. 27, the container 40 may comprise a wall 41 having two circumferential portions 41a, 41b, wherein a first portion 41a surrounds the chamber 43 for receiving the polymer structure/solution, and wherein a second portion 41b of the wall 41 surrounds a further chamber 45 for receiving a fluid F, particularly saline solutions, buffer solutions, chemo-attractant solution, growth-factor solution, cell suspension or mixture thereof and other solution inducing responses in cell functions). Here, the first electrode 21 (or second electrode) is slidably arranged in a first and a second recess 401, 402 in said wall 41, which recesses 401, 402 face each other, so that the first electrode 21 extends across the chamber 43, and closes said recesses 401, 402. Particularly, the first electrode 21 protrudes out of the container 40 (e.g. for moving it manually). Further, the second recess 402 is in flow connection with the further chamber 45, so that—when the first electrode 21 is removed from said second recess 402—a fluid F (e.g. a Chemo-attractant solution, growth-factor solution, cell suspension or mixture thereof and other solution inducing responses in cell functions) stored in the further chamber 45 can flow through said second recess 402 into the (first) chamber 43, namely into a channel 30 of the polymer structure 1/hydrogel being formed with help of the electrodes 21, 22. The second portion of the wall 41b comprises a third recess 403 that is aligned with the second recess 402 (and e.g. also with the first recess 401), so that the second recess 402 can be closed by inserting a closure means (e.g. rod or pin) 60 into the second recess 402 via the third recess 403. Further, the two chambers 43, 45 are each delimited on the lower side by a bottom 42 from which said portions 41a, 41b of the wall 41 extend, wherein the bottom 42 of the first chamber 43 may comprise a counter electrode (second electrode or first electrode) 22 or may be formed as a counter electrode 22. By means of a container 40 according to FIG. 27 a polymer structure 1 can be generated that comprises a channel 30 in the polymer structure 1, particularly crossing the structure 1, and a linking density gradient at an interface 3 between the polymer structure 1 and the lumen 31 of said channel 30. Such a channel 30 can be filled with a fluid F, e.g. as described above.

REFERENCES

[1] a) M. P. Lutolf, J. A. Hubbell, Nat Biotech 2005, 23, 47; b) N. Tirelli, M. P. Lutolf, A. Napoli, J. A. Hubbell, Reviews in Molecular Biotechnology 2002, 90, 3; c) M. V. Tsurkan, K. Chwalek, S. Prokoph, A. Zieris, K. R. Levental, U. Freudenberg, C. Werner, Advanced Materials 2013, 25, 2606.
[2] J. Patterson, M. M. Martino, J. A. Hubbell, Mater Today 2010, 13, 14.
[3] R. G. Wylie, S. Ahsan, Y. Aizawa, K. L. Maxwell, C. M. Morshead, M. S. Shoichet, Nature materials 2011, 10, 799.
[4] a) D. R. Griffin, J. Borrajo, A. Soon, G. F. Acosta-Velez, V. Oshita, N. Darling, J. Mack, T. Barker, M. L. Iruela-Arispe, T. Segura, Chembiochem: a European journal of chemical biology 2014, 15, 233; b) W. M. Gramlich, I. L. Kim, J. A. Burdick, Biomaterials 2013, 34, 9803; c) K. A. Mosiewicz, L. Kolb, A. J. van der Vlies, M. M. Martino, P. S. Lienemann, J. A. Hubbell, M. Ehrbar, M. P. Lutolf, Nature materials 2013, 12, 1072; d) C. A. DeForest, K. S. Anseth, Angewandte Chemie 2012, 51, 1816; e) J. C. Hoffmann, J. L. West, Integrative biology: quantitative biosciences from nano to macro 2013, 5, 817.
[5] Y. C. Chiu, J. C. Larson, A. Isom, Jr., E. M. Brey, Tissue Eng Part C Methods 2010, 16, 905.
[6] a) X. Wu, L. Black, G. Santacana-Laffitte, C. W. Patrick, Jr., J Biomed Mater Res A 2007, 81, 59; b) F. Zhang, C. He, L. Cao, W. Feng, H. Wang, X. Mo, J. Wang, Int J Biol Macromol 2011, 48, 474; c) P. B. Welzel, M. Grimmer, C. Renneberg, L. Naujox, S. Zschoche, U. Freudenberg, C. Werner, Biomacromolecules 2012, 13, 2349.
[7] V. Milleret, B. R. Simona, P. S. Lienemann, J. Voros, M. Ehrbar, Advanced healthcare materials 2014, 3, 508.
[8] M. Ehrbar, S. C. Rizzi, R. Hlushchuk, V. Djonov, A. H. Zisch, J. A. Hubbell, F. E. Weber, M. P. Lutolf, Biomaterials 2007, 28, 3856.
[9] M. Ehrbar, A. Sala, P. Lienemann, A. Ranga, K. Mosiewicz, A. Bittermann, S. C. Rizzi, F. E. Weber, M. P. Lutolf, Biophysical Journal 2011, 100, 284.
[10] P. Dorig, D. Ossola, A. M. Truong, M. Graf, F. Stauffer, J. Voros, T. Zambelli, Biophys J 2013, 105, 463.
[11] M. Ehrbar, A. Sala, P. Lienemann, A. Ranga, K. Mosiewicz, A. Bittermann, S. C. Rizzi, F. E. Weber, M. P. Lutolf, Biophys J 2011, 100, 284.
[12] C. M. Lo, Y. L. Wang, Mol Biol Cell 1999, 10, 259a.
[13] E. Hadjipanayi, V. Mudera, R. A. Brown, Cell motility and the cytoskeleton 2009, 66, 121.
[14] S. P. Singh, M. P. Schwartz, J. Y. Lee, B. D. Fairbanks, K. S. Anseth, Biomaterials science 2014, 2, 1024.
[15] N. Annabi, J. W. Nichol, X. Zhong, C. Ji, S. Koshy, A. Khademhosseini, F. Dehghani, Tissue Eng Part B Rev 2010, 16, 371.
[16] M. P. Cuchiara, A. C. Allen, T. M. Chen, J. S. Miller, J. L. West, Biomaterials 2010, 31, 5491.
[17] a) M. Verhulsel, M. Vignes, S. Descroix, L. Malaquin, D. M. Vignjevic, J. L. Viovy, Biomaterials 2014, 35, 1816; b) F. P. W. Melchels, M. A. N. Domingos, T. J. Klein, J. Maida, P. J. Bartolo, D. W. Hutmacher, Prog Polym Sci 2012, 37, 1079.
[18] F. Bordeleau, L. N. Tang, C. A. Reinhart-King, Phys Biol 2013, 10.
[19] M. Ehrbar, S. C. Rizzi, R. G. Schoenmakers, B. S. Miguel, J. A. Hubbell, F. E. Weber, M. P. Lutolf, Biomacromolecules 2007, 8, 3000.
[20] A. J. Engler, S. Sen, H. L. Sweeney, D. E. Discher, Cell 2006, 126, 677.

We claim:

1. A method for embedding cells into a polymer structure, the method comprising the steps of:
providing a polymer structure formed by at least one polymer in a container having a top opening, wherein said polymer structure comprises a volume delimited by the container and a free top surface extending along the entire top opening of the container, wherein said polymer comprises a plurality of polymer chains connected by linkings formed in the container, wherein the polymer structure is characterized by a linking density, wherein said linking density increases monotonously from the top surface into the volume of the polymer structure, wherein the linking density is minimal at the top surface and reaches a maximum in the volume at a distance from the top surface ranging between 1 μm and 1000 μm, thereby forming a linking density gradient, and
seeding cells or cell aggregates comprising said cells on said top surface of said polymer structure residing in the container such that the cells rest on the top surface after having been seeded with each cell being arranged above the top surface in a vertical direction and such that the cells migrate from the top surface into the volume of the polymer structure along said linking density gradient to become embedded within the volume.

2. The method according to claim 1, wherein the linking density is zero at the top surface.

3. The method according to claim 1, wherein said linking density of the polymer structure increases monotonously along a gradient direction which is perpendicular to the top surface.

4. The method according to claim 3, wherein said linking density of the polymer structure is uniform along the entire planar top surface of the polymer structure.

5. The method according to claim 1, wherein said top surface of the polymer structure extends along a horizontal direction.

6. The method according to claim 1, wherein said cells are seeded on said top surface of the polymer structure at a plurality of positions, which positions form a two-dimensional array on said top surface.

7. The method according to claim 1, wherein the polymer is one of the following polymers: a natural polymer, fibrin, alginate, chitosan, hyaluronic acid, chondroitin sulfate, heparin, polyethylene glycol (PEG), polylactic acid, SU-8, a polymer consisting of or including one of: a combination of monomers, dopamine, amine-containing groups, lysine, catechols, phosphate containing groups, thiol containing groups, alcohol containing groups, active esters, a dendrimer containing one of: an amine-containing group, a phosphate-containing group, thiol-containing group, an alcohol-containing group.

8. The method according to claim 1, wherein the polymer structure or volume comprises one of the following shapes: semi-spherical, cylindrical, pyramidal, cubical, cuboidal, and prismatoidal.

9. The method according to claim 1, wherein said polymer structure is hydrogel.

10. The method according to claim 1, wherein said polymer structure is formed in said container such that the top surface of the polymer structure is not in contact with the container.

11. The method according to claim 1, wherein the container comprises a bottom wall, at least one side wall adjacent to said bottom wall, and an opening opposite said bottom wall, wherein the bottom wall and the at least one side wall delimit a chamber, in which the volume of the polymer structure is formed, wherein the cells are seeded on the top surface of the polymer structure through the opening.

12. The method according to claim 11, wherein the top surface of the polymer structure is extended parallel to said bottom wall and perpendicular to said at least one side wall.

13. The method according to claim 1, wherein said container comprises a plurality of wells, wherein a polymer structure formed by at least one polymer is provided in each well, wherein each of said polymer structures comprises a respective volume and a respective top surface, wherein said polymer comprises a plurality of polymer chains connected by linkings, wherein each of the polymer structures is characterized by a linking density, wherein said linking density increases monotonously from the respective top surface into the respective volume of the polymer structure, wherein the respective linking density is minimal at the respective top surface and reaches a maximum in the respective volume, thereby forming a respective linking density gradient, wherein cells are seeded on each top surface of each polymer structure, such that the cells migrate into the volume of the polymer structure along said respective linking density gradient to become embedded within the respective volume.

14. The method according to claim 1, wherein the direction of the gradient is normal to said top surface at each point of the top surface.

15. The method according to claim 1, wherein the linking density gradient prevents cell spreading on the top surface upon seeding of the cells or cell aggregates thus preventing the formation of a flat cell layer on the top surface of the polymer structure.

16. The method according to claim 1, wherein the polymer structure is maintained intact before and during said seeding.

17. The method according to claim 1, wherein the cells are mammalian cells.

18. The method according to claim 1, wherein the top surface is a planar top surface.

* * * * *